United States Patent
Abe

(10) Patent No.: US 9,846,809 B2
(45) Date of Patent: Dec. 19, 2017

(54) INFORMATION PROCESSING APPARATUS, METHOD, AND STORAGE MEDIUM STORING PROGRAM

(71) Applicant: CANON KABUSHIKI KAISHA, Tokyo (JP)

(72) Inventor: Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 15/054,332

(22) Filed: Feb. 26, 2016

(65) Prior Publication Data
US 2016/0260460 A1 Sep. 8, 2016

(30) Foreign Application Priority Data
Mar. 6, 2015 (JP) .................................. 2015-045090

(51) Int. Cl.
G06K 9/00 (2006.01)
H04N 1/387 (2006.01)

(52) U.S. Cl.
CPC ......... *G06K 9/00684* (2013.01); *H04N 1/387* (2013.01); *H04N 1/3873* (2013.01)

(58) Field of Classification Search
None
See application file for complete search history.

(56) References Cited

U.S. PATENT DOCUMENTS

| | | | | |
|---|---|---|---|---|
| 8,730,397 B1* | 5/2014 | Zhang | ............... | G06F 17/30849 348/559 |
| 8,935,322 B1* | 1/2015 | Grosz | ................. | G06F 3/04842 709/203 |
| 9,230,155 B2 | 1/2016 | Yamazoe | | |
| 2010/0067027 A1* | 3/2010 | Kunieda | .............. | H04N 1/6027 358/1.9 |
| 2012/0294514 A1* | 11/2012 | Saunders | ........... | H04N 1/00196 382/159 |
| 2013/0022273 A1* | 1/2013 | Yamazoe | ........... | G06K 9/00228 382/190 |
| 2014/0101152 A1* | 4/2014 | Chen | ....................... | G06T 11/60 707/736 |
| 2015/0189107 A1* | 7/2015 | Murata | ................... | G06T 11/60 345/629 |
| 2016/0011736 A1* | 1/2016 | Hong | .................... | G06F 3/0488 715/731 |

FOREIGN PATENT DOCUMENTS

JP 2013-26935 A 2/2013

* cited by examiner

*Primary Examiner* — James Hannett
(74) *Attorney, Agent, or Firm* — Fitzpatrick, Cella, Harper & Scinto

(57) ABSTRACT

A first still image included in a still image file and a second still image extracted from a moving image included in a moving image file are evaluated as layout target on a template. The layout target on the template is specified out of the first still image and the second still image in accordance with the evaluation, and the still image file of the layout target is laid out on the template. The first still image and the second still image are evaluated such that the possibility that the second still image is specified becomes higher than that for the first still image.

22 Claims, 19 Drawing Sheets

FIG. 3
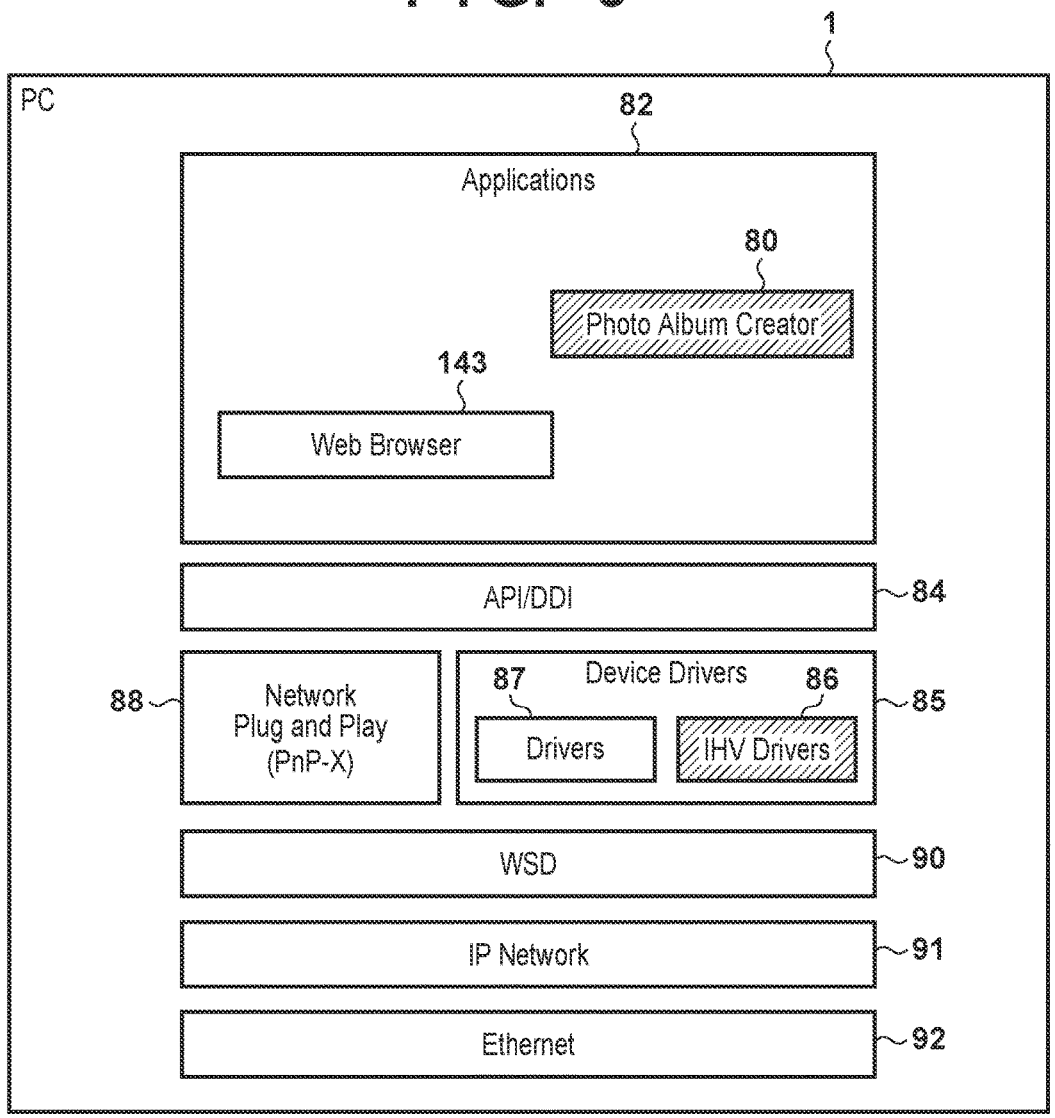
 ... STANDARD MODULES BUNDLED IN OS
 ... MODULES AVAILABLE FROM IHV

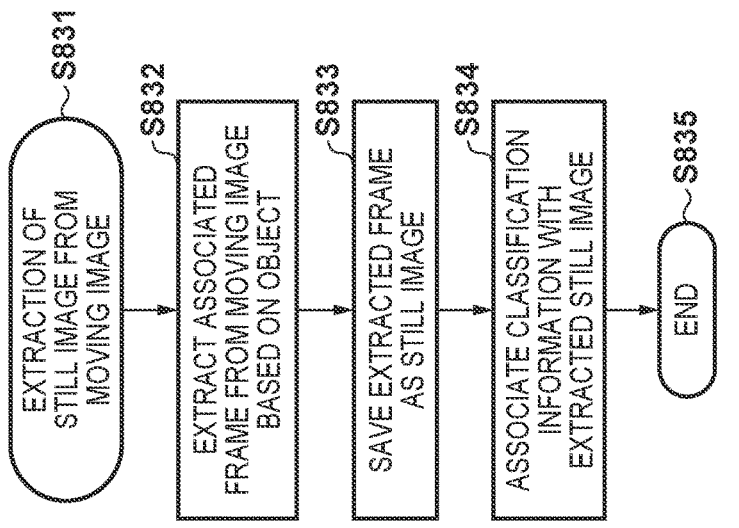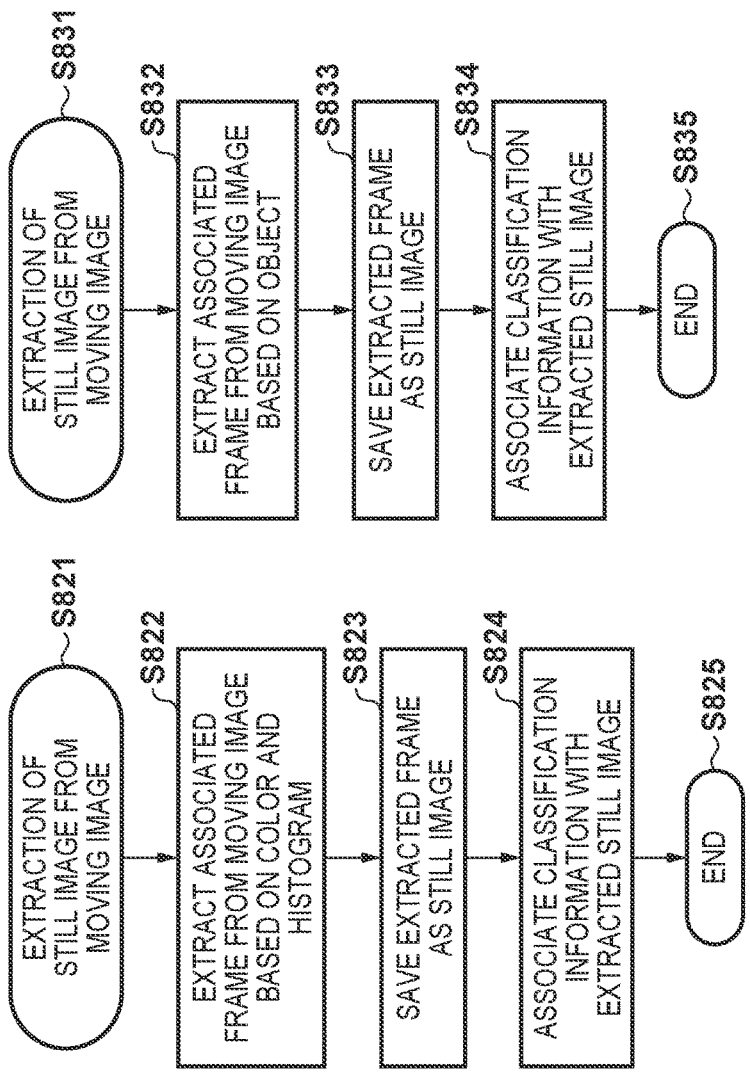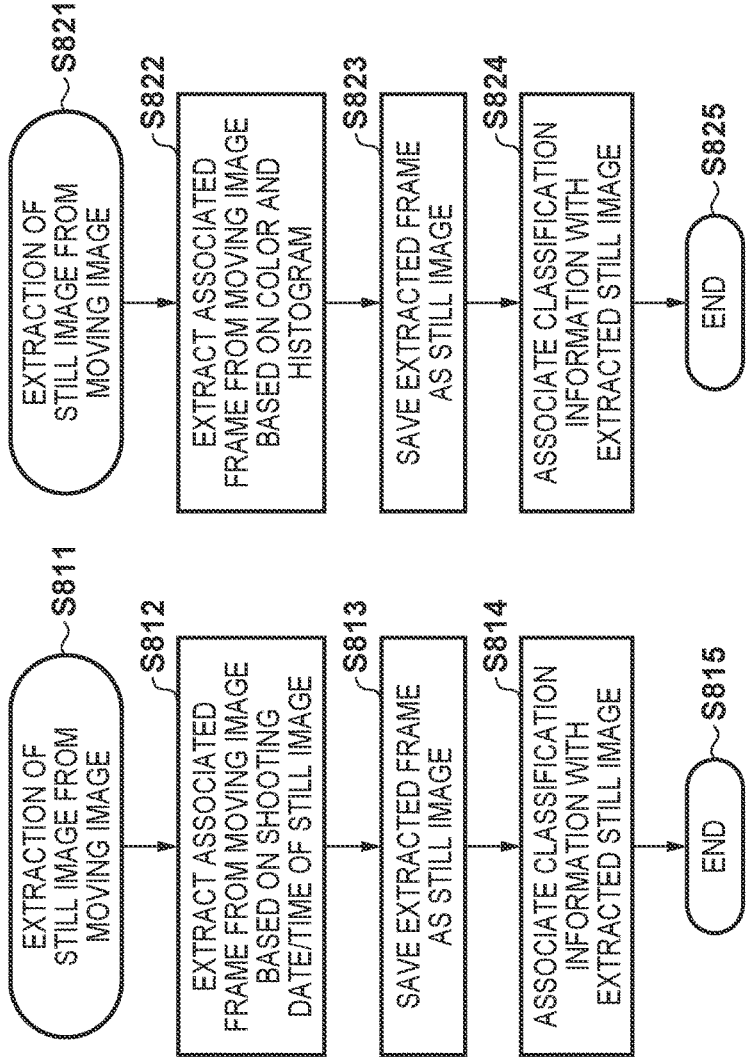

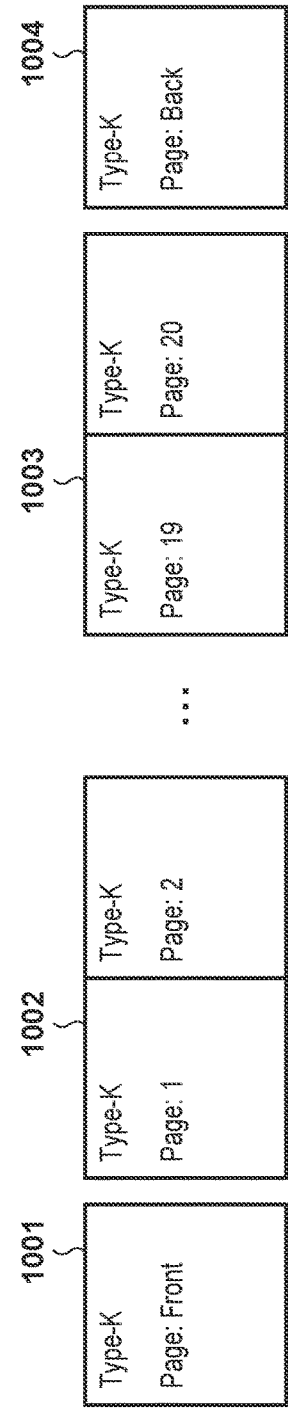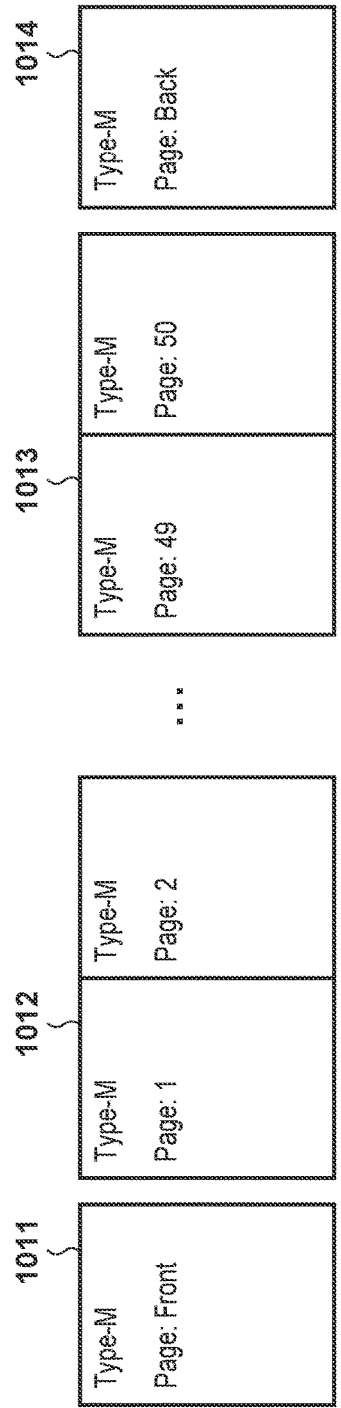

FIG. 13A

| Album Type | Group | Page | Slot | File |
|---|---|---|---|---|
| K | G2 | 2 | 1 | static1.jpg |
| K | G2 | 2 | 2 | static2.jpg |
| K | G2 | 2 | 3 | static3.jpg |
| K | G2 | 2 | 4 | dynamic20.jpg |

FIG. 13B

| Album Type | Group | Page | Slot | File |
|---|---|---|---|---|
| K | G2 | 2 | 1 | static1.jpg |
| K | G2 | 2 | 2 | static2.jpg |
| K | G2 | 2 | 3 | static3.jpg |
| K | G2 | 2 | 4 | dynamic24.jpg |

FIG. 13C

| Album Type | Group | Page | Slot | File |
|---|---|---|---|---|
| K | G5 | 5 | 1 | static14.jpg |
| K | G5 | 5 | 2 | static28.jpg |
| K | G5 | 5 | 3 | dynamic44.jpg |
| K | G5 | 5 | 4 | dynamic45.jpg |
| K | G5 | 5 | 5 | dynamic46.jpg |

FIG. 13D

| Album Type | Group | Page | Slot | File |
|---|---|---|---|---|
| K | G5 | 5 | 1 | static14.jpg |
| K | G5 | 5 | 2 | static28.jpg |
| K | G5 | 5 | 3 | dynamic44.jpg |
| K | G5 | 5 | 4 | dynamic55.jpg |
| K | G5 | 5 | 5 | dynamic88.jpg |

FIG. 13E

| Album Type | Group | Page | Slot | Attribute | File |
|---|---|---|---|---|---|
| K | G8 | 15,16 | 1 | Static | static11.jpg |
| K | G8 | 16 | 2 | Static | static12.jpg |
| K | G8 | 15 | 3 | Dynamic | dynamic22.jpg |
| K | G8 | 15 | 4 | Dynamic | dynamic43.jpg |
| K | G8 | 15,16 | 5 | Dynamic | dynamic50.jpg |
| K | G8 | 16 | 6 | Dynamic | dynamic78.jpg |
| K | G8 | 16 | 7 | Dynamic | dynamic85.jpg |

F I G. 14

| File | Elements | | | | | Score | |
|---|---|---|---|---|---|---|---|
| | Color | Contrast | Brightness | Focus | Composition | Original | Modified |
| static1.jpg | 9 | 8 | 9 | 10 | 9 | 9.0 | – |
| static2.jpg | 7 | 8 | 8 | 9 | 8 | 8.0 | – |
| static3.jpg | 7 | 7 | 7 | 7 | 7 | 7.0 | – |
| static4.jpg | 5 | 6 | 5 | 4 | 5 | 5.0 | – |
| static5.jpg | 5 | 5 | 5 | 5 | 5 | 5.0 | – |
| static6.jpg | 5 | 3 | 4 | 4 | 4 | 4.0 | – |
| static7.jpg | 4 | 4 | 4 | 4 | 4 | 4.0 | – |
| static8.jpg | 3 | 3 | 3 | 3 | 3 | 3.0 | – |
| static9.jpg | 2 | 3 | 2 | 1 | 2 | 2.0 | – |
| static10.jpg | 1 | 1 | 1 | 1 | 1 | 1.0 | – |
| dynamic20.jpg | 5 | 5 | 5 | 5 | 5 | 5.0 | 6.0 |
| dynamic10.jpg | 5 | 5 | 3 | 3 | 4 | 4.0 | 4.8 |
| dynamic30.jpg | 3 | 5 | 3 | 5 | 4 | 4.0 | 4.8 |
| dynamic40.jpg | 3 | 2 | 4 | 3 | 3 | 3.0 | 3.6 |
| dynamic50.jpg | 3 | 3 | 3 | 3 | 3 | 3.0 | 3.6 |
| dynamic60.jpg | 2 | 2 | 2 | 2 | 2 | 2.0 | 2.4 |
| dynamic70.jpg | 1 | 3 | 1 | 2 | 3 | 2.0 | 2.4 |
| dynamic80.jpg | 1 | 1 | 1 | 1 | 1 | 1.0 | 1.2 |

F I G. 15

| Slot | Reference Point [cm] | Length [cm] | Height [cm] | Rotation [degrees] |
|---|---|---|---|---|
| K-B-G8-1-S | (1,1) | 16 | 6 | 0 |
| K-B-G8-2-S | (18,1) | 11 | 4 | 0 |
| K-B-G8-3-D | (1,8) | 5 | 2 | 0 |
| K-B-G8-4-D | (6.5,8) | 5 | 2 | 0 |
| K-B-G8-5-D | (12,8) | 5 | 2 | 0 |
| K-B-G8-6-D | (17.5,8) | 5 | 2 | 0 |
| K-B-G8-7-D | (23.0,8) | 5 | 2 | 0 |

FIG. 17A

| JPEG | MPEG | Date&Time | Info | Group | Frame | Related File |
|---|---|---|---|---|---|---|
| dynamic15.jpg | video1.mp4 | 20140330100010334 | - | - | 1 | - |
| dynamic16.jpg | video1.mp4 | 20140330100011334 | - | - | 31 | - |
| dynamic17.jpg | video1.mp4 | 20140330100012334 | - | - | 61 | - |
| dynamic18.jpg | video1.mp4 | 20140330100013334 | - | - | 91 | - |
| dynamic19.jpg | video1.mp4 | 20140330100014334 | - | - | 121 | - |
| dynamic20.jpg | video1.mp4 | 20140330100015334 | - | - | 151 | - |
| dynamic21.jpg | video1.mp4 | 20140330100016334 | - | - | 181 | - |
| dynamic22.jpg | video1.mp4 | 20140330100017334 | - | - | 211 | - |
| dynamic23.jpg | video1.mp4 | 20140330100018334 | - | - | 241 | - |
| dynamic24.jpg | video1.mp4 | 20140330100019334 | - | - | 271 | - |
| dynamic25.jpg | video1.mp4 | 20140330100020334 | - | - | 301 | - |

F I G. 17B

| JPEG | MPEG | Date&Time | Info | Group | Frame | Related File |
|---|---|---|---|---|---|---|
| static100.jpg | -- | 20131224200508444 | 2013122420 | dateTime1 | -- | video300.mp4 |
| static102.jpg | -- | 20131224200804123 | 2013122420 | dateTime1 | -- | video300.mp4 |
| static103.jpg | -- | 20131224201458345 | 2013122420 | dateTime1 | -- | video300.mp4 |
| static108.jpg | -- | 20131228093015234 | 2013122809 | dateTime2 | -- | -- |
| static109.jpg | -- | 20131228094548075 | 2013122809 | dateTime2 | -- | -- |
| static120.jpg | -- | 20140101120300022 | histogram4-1 | histogram4 | -- | video320.mp4 |
| static121.jpg | -- | 20140101121255330 | histogram4-2 | histogram4 | -- | video320.mp4 |
| static123.jpg | -- | 20140102141044001 | histogram5-1 | histogram5 | -- | -- |
| static125.jpg | -- | 20140102151225012 | histogram5-2 | histogram5 | -- | -- |
| static155.jpg | -- | 20140814063322345 | object8-1 | object8 | -- | video340.mp4 |
| static156.jpg | -- | 20140814070707888 | object8-2 | object8 | -- | video340.mp4 |
| static157.jpg | -- | 20141220122538443 | object9-1 | object9 | -- | -- |
| static160.jpg | -- | 20141220122538058 | object9-2 | object9 | -- | -- |
| dynamic301.jpg | video300.mp4 | 20131224200805432 | 2013122420 | dateTime1 | 24 | static102.jpg |
| dynamic302.jpg | video300.mp4 | 20131224200806003 | 2013122420 | dateTime1 | 70 | static102.jpg |
| dynamic321.jpg | video320.mp4 | 20140102140435998 | histogram4-2 | histogram4 | 730 | static120.jpg |
| dynamic322.jpg | video320.mp4 | 20140102140544556 | histogram4-3 | histogram4 | 2814 | static120.jpg |
| dynamic323.jpg | video320.mp4 | 20140102140824788 | histogram4-4 | histogram4 | 8115 | static120.jpg |
| dynamic341.jpg | video340.mp4 | 20140707101030111 | object8-3 | object8 | 1218 | static155.jpg |
| dynamic342.jpg | video340.mp4 | 20140707101228058 | object8-4 | object8 | 2958 | static155.jpg |

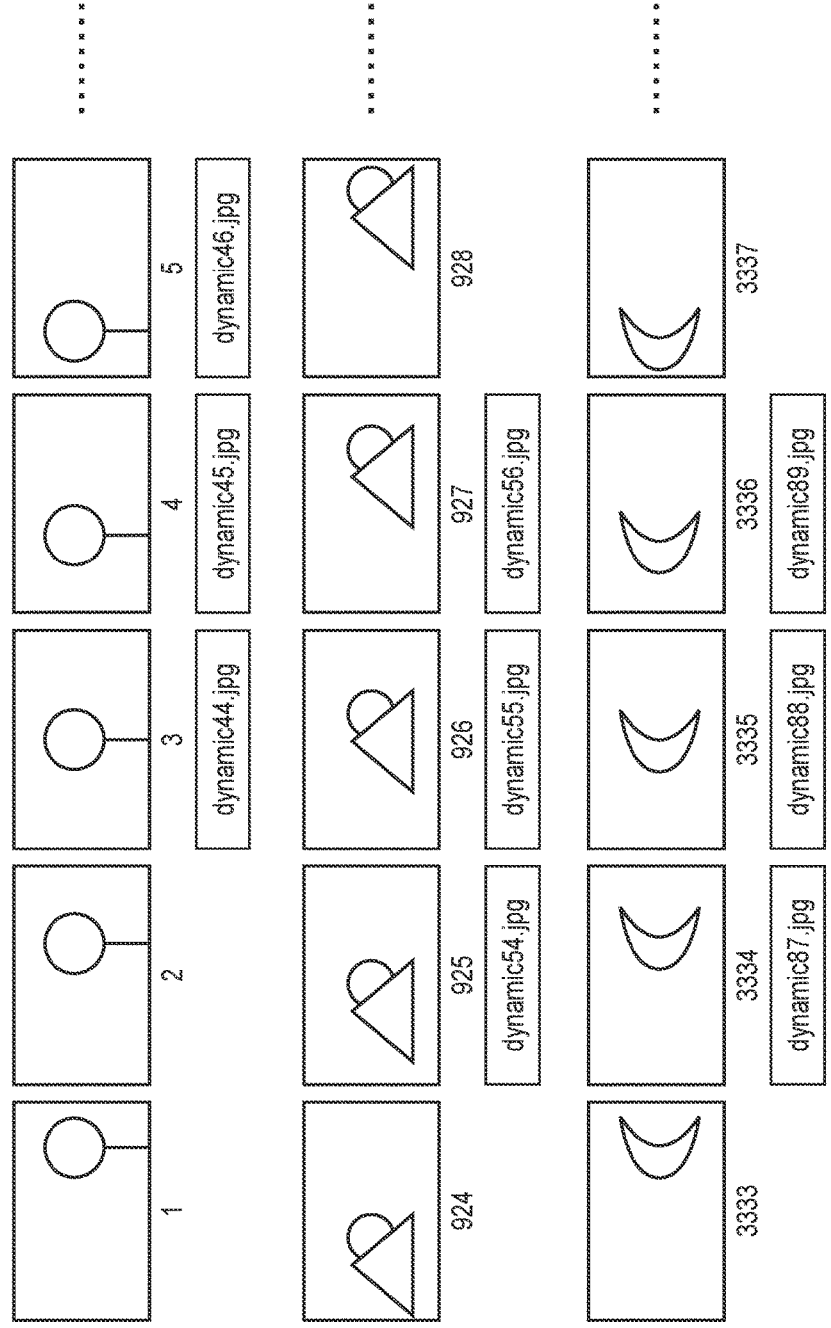

INFORMATION PROCESSING APPARATUS, METHOD, AND STORAGE MEDIUM STORING PROGRAM

BACKGROUND OF THE INVENTION

Field of the Invention

The present invention relates to an information processing apparatus for performing layout processing of a file, a method, and a storage medium storing a program.

Description of the Related Art

There is recently a product that automatically lays out a plurality of still images on a template for a photo album using a photo album creation application, thereby automatically generating a photo album. Additionally, as a technique of extracting a still image from a moving image, there is a technique of specifying a plurality of frame groups of a moving image based on a frame interval according to a user instruction and extracting an output target frame based on the analysis result of a plurality of frames included in each frame group (Japanese Patent Laid-Open No. 2013-26935).

Even in a case in which a user wants to create a photo album on which both a still image and a moving image are laid out, if the application for automatically creating a photo album does not handle a moving image as an image for a photo album, an image included in the moving image is not laid out by the application.

SUMMARY OF THE INVENTION

An aspect of the present invention is to eliminate the above-mentioned problems with the conventional technology. The present invention provides an information processing apparatus that appropriately performs layout processing including an image extracted from a moving image, a method, and a storage medium storing a program.

The present invention in one aspect provides a method, comprising: evaluating a first still image included in a still image file and a second still image extracted from a moving image included in a moving image file as layout targets on a template; specifying a still image of the layout target on the template out of the first still image and the second still image in accordance with the evaluation; and laying out the specified still image of the layout target on the template, wherein the first still image and the second still image are evaluated such that a possibility that the second still image is specified as the layout target on the template becomes higher than that for the first still image.

According to the present invention, it is possible to appropriately perform layout processing including an image extracted from a moving image.

Further features of the present invention will become apparent from the following description of exemplary embodiments with reference to the attached drawings.

BRIEF DESCRIPTION OF THE DRAWINGS

FIG. 3 is a block diagram showing the software configuration of the PC;

FIGS. 8A to 8C are flowcharts showing processing of extracting a still image from a moving image;

FIGS. 10A and 10B are views showing structures of photo albums;

FIGS. 13A to 13E are views showing the relationship of layout between slots and still images;

FIG. 14 is a view showing the scores of still images;

FIG. 15 is a view showing the position information of slots;

FIGS. 17A and 17B are views showing association between still images and moving images and classification of still images; and FIG. 18 is a view showing frames of a moving image.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
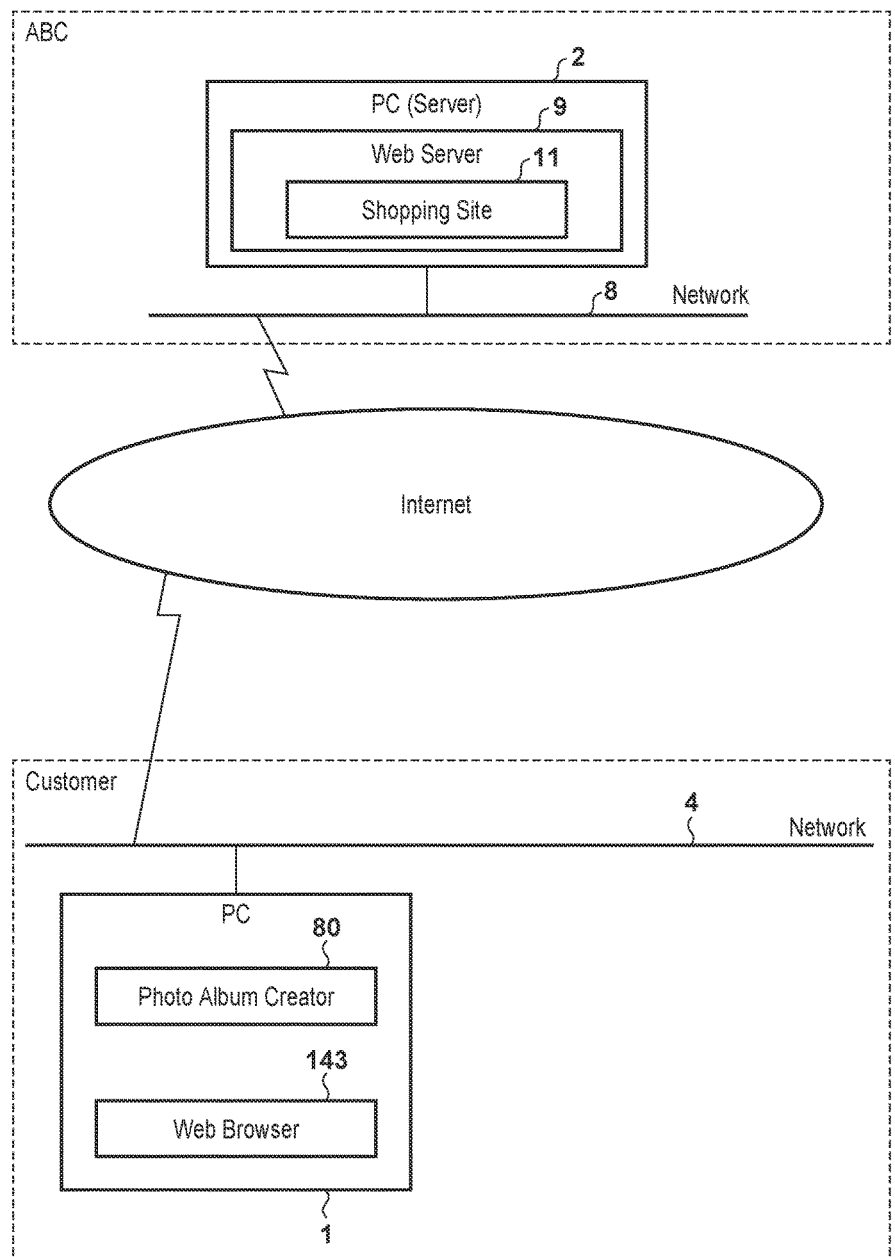
FIG. 1 is a block diagram showing the arrangement of a system including an information processing apparatus.

FIG. 1 is a block diagram showing an example of the arrangement of a photo album creation/order system formed from an information processing apparatus. Referring to FIG. 1, each of information processing apparatuses 1 and 2 is formed from, for example, a general personal computer or server (to be sometimes abbreviated as a PC hereinafter). Each of the PCs 1 and 2 is formed from hardware to be described later with reference to FIG. 2, in which an operating system (to be sometimes abbreviated as an OS hereinafter) equivalent to Windows® 8 or Windows® Server 2012 is installed as an OS. The PCs 1 and 2 are connected to networks 4 and 8 formed from Ethernet®, respectively.

A photo album creation application 80 (to be sometimes abbreviated as an application hereinafter) is formed from a file (*.EXE) in a format executable on, for example, Windows®. A web browser application 143 (to be sometimes abbreviated as a web browser hereinafter) is a browser used when using WWW (World Wide Web). The network 4 is a home network for a general household, which is constructed in a home where the user (for example, a customer) who uses the PC 1 inhabits. The network 8 is an office network constructed in the ABC company.

The PC 2 connected to the network 8 includes a web server 9 having the function of a web server, and provides the web site of the ABC company via the Internet. A shopping site 11 is a shopping site on which the ABC company provides a service for users. The user can order a photo album using the shopping site 11.

Figure 2:
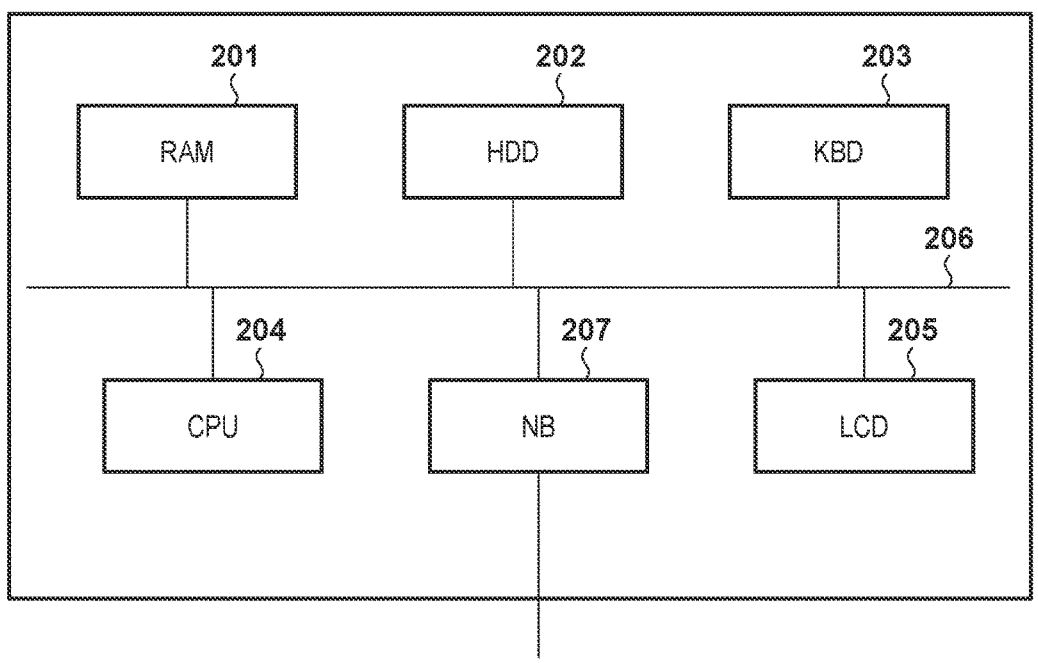
FIG. 2 is a block diagram showing the hardware arrangement of a PC.

FIG. 2 is a block diagram showing an example of the hardware arrangement of the PC. Each of the PCs 1 and 2 includes hardware as shown in FIG. 2. As shown in FIG. 2, each of the PCs 1 and 2 includes a RAM 201 that is a random access memory unit, an HDD 202 that is a hard disk drive unit, a KBD 203 that is a keyboard unit, and a CPU 204. Each of the PCs 1 and 2 further includes an LCD 205 that is a display, and an NB 207 that is a network board. Each of the PCs 1 and 2 also includes a bus 206 that communicably connects at least the blocks shown in FIG. 2 to each other. Note that the HDD 202 is, for example, the storage unit of the PC 1 or 2. The storage unit may be a portable CD-ROM, a fixed internal ROM, or the like. The KBD 203 is, for example, the input unit of the PC 1 or 2. The CPU 204 is, for example, the control unit of the PC 1 or 2. The LCD 205 is, for example, the display unit of the PC 1 or 2. The NB 207 is, for example, the communication control unit of the PC 1 or 2.

Applications such as the application 80 and the web browser 143 and modules (software) shown in FIG. 3 are stored in, for example, the HDD 202, read out to the RAM 201 as needed, and executed by the CPU 204. The CPU 204 thus implements the functions of applications such as the application 80 and the web browser 143 and modules (software) shown in FIG. 3.

FIG. 3 is a block diagram showing an example of the module configuration of the software of the PC. Referring to FIG. 3, a module 92 is an Ethernet® control stack for controlling Ethernet®. A module 91 is an IP network control stack for controlling an IP network. A module 90 is a WSD control stack for controlling a WSD (Web Service on Devices) that provides a mechanism to search for a device on a network. A module 88 is a PnP-X control stack for controlling plug and play of a network. Note that PnP-X stands for Plug and Play Extensions that is installed in the Windows® 8 OS as a series of standard extension functions, and provides a support for a network connected device. A module 85 is a device driver group and includes standard drivers 87 bundled in the OS and IHV drivers 86 provided by Independent Hardware Vendor (IHV).

A module 84 is an application/DDI interface and includes Application Programming Interface (API) and Device Driver Interface (DDI). The module 80 is, for example, a photo album creation application, and the module 143 is, for example, a web browser application. A module 82 is an application group and includes the application 80 and the web browser 143.

Figure 4A:
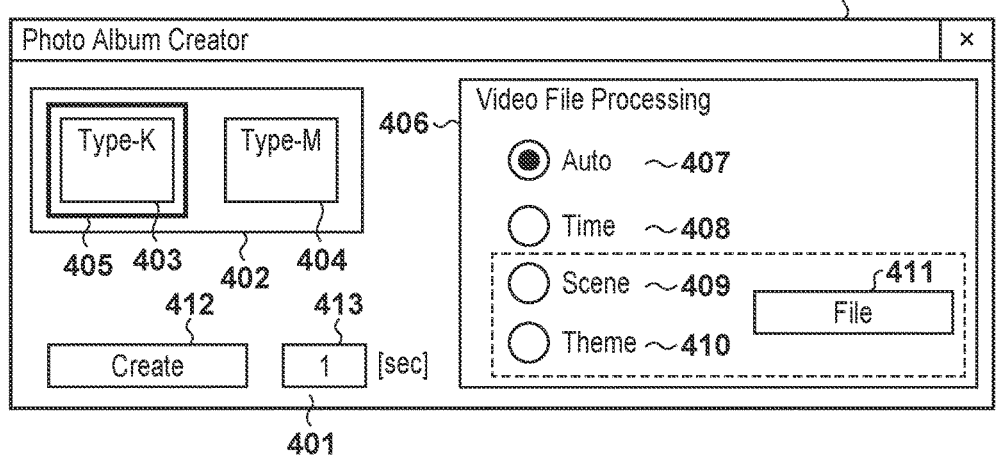
FIGS. 4A to 4C are views showing the screens of an application.
Figure 4B:
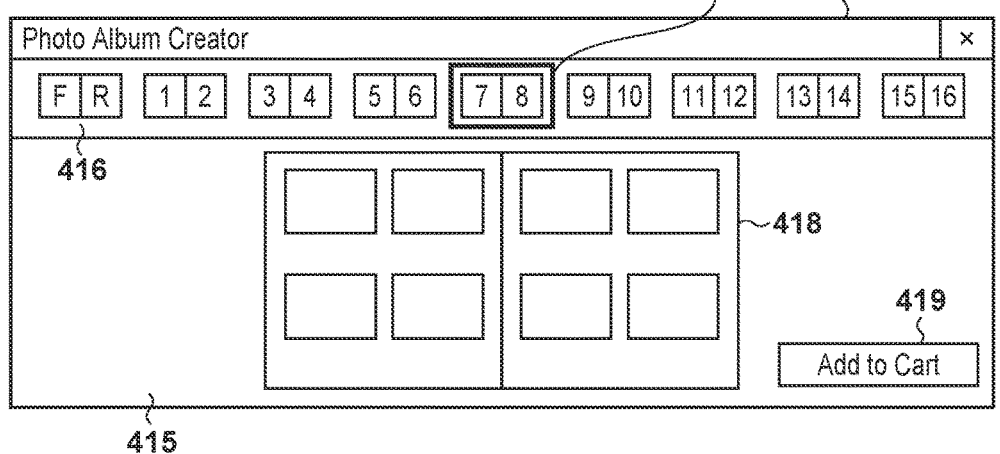
Figure 4C:
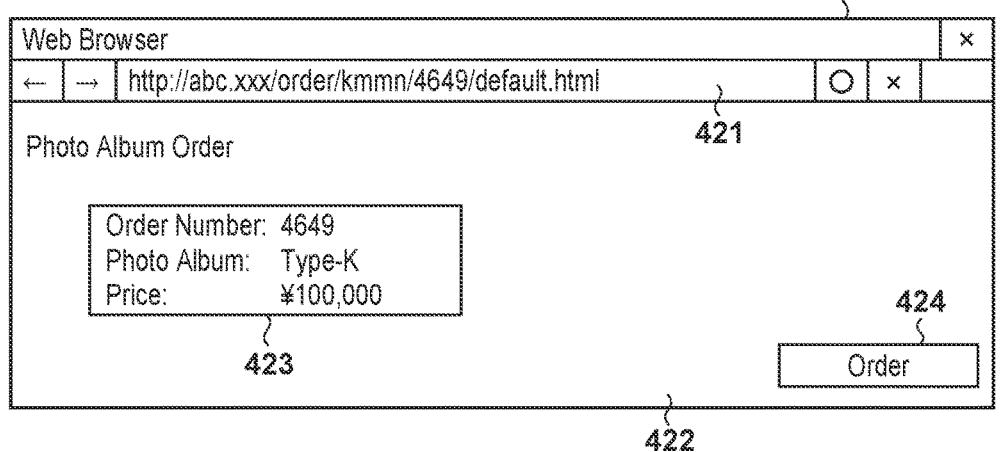

FIGS. 4A to 4C are views showing examples of the screens of the application. FIG. 4A shows an example of the main screen of the application 80. FIG. 4B shows an example of the preview/editing screen of the application 80. FIG. 4C shows an example of a photo album order screen displayed on the web browser 143.

Referring to FIG. 4A, a screen 401 is main screen of the application 80. A selection portion 402 is a photo album type selection portion, which can accept selection of one of type-K and type-M as the type of a photo album to be created. A button 403 is a photo album skeleton button configured to accept selection of a photo album of type-K. A photo album of type-K is, for example, a photo album as follows.
Shape: 15 cm×15 cm square
Number of pages: 20
Paper type: satin
Binding: half fold
Cover: soft A button 404 is a photo album skeleton button configured to accept selection of a photo album of type-M. A photo album of type-M is, for example, a photo album as follows.
Shape: A4 (210 mm×297 mm) Portrait
Number of pages: 50
Paper type: glossy
Binding: flat
Cover: hard A mark 405 is a photo album selection state indicating mark. The mark 405 is displayed on the photo album selection button associated with the selected photo album. FIG. 4A shows a state in which the button 403 is pressed, and a photo album of type-K is selected. A button 412 is a photo album creation button. Upon detecting the pressing of the button 412, the application 80 starts creating a photo album. A selection portion 406 is a moving image file processing method selection portion, which accepts selection of one of auto, time, scene, and theme by a radio button as a processing method of extracting a still image from a moving image.

A button 407 is an auto selection button. As a processing method of extracting a still image from a moving image, a method of executing automatic processing shown in FIG. 5 (to be described later) corresponds to the button 407. The processing is executed when the button 407 is pressed. A button 408 is a time selection button. As a processing method of extracting a still image from a moving image, a method of executing processing based on a shooting date/time as shown in FIG. 8A (to be described later) corresponds to the button 408. The processing is executed when the button 408 is pressed. A button 409 is a scene selection button. As a processing method of extracting a still image from a moving image, a method of executing screen determination processing based on a color and histogram as shown in FIG. 8B (to be described later) corresponds to the button 409. The processing is executed when the button 409 is pressed. A button 410 is a theme selection button. As a processing method of extracting a still image from a moving image, a method of executing theme determination processing based on an object as shown in FIG. 8C (to be described later) corresponds to the button 410. The processing is executed when the button 410 is pressed.

A button 411 is a file selection button, which is enabled when the scene selection button 409 or theme selection button 410 is selected. Upon detecting the pressing of the button 411 by the user, a file selection screen (not shown) is displayed, and the user is allowed to select a still image file. The application 80 temporarily saves a still image file selected by the user via the file selection screen in the work memory in the RAM 201 used by the application 80. Upon detecting the pressing of the photo album creation button 412 by the user, the application 80 executes the above-described scene determination processing or theme determination processing based on the still image file temporarily saved in the work memory. A frame extraction time interval designation portion 413 can accept designation of a time interval to extract a still image from a moving image on, for example, a second basis from the user. Note that the default value is set to, for example, 1 sec.

Referring to FIG. 4B, a screen 415 is the preview/editing screen of the application 80. A preview display portion 418 is a preview display portion. The application 80 displays, in the preview display portion 418, a preview of a double spread of the photo album that is being created. A double spread selection portion 416 can accept, from the user, selection of a double spread to be displayed in the preview display portion 418. A double spread selection state indicating mark 417 is displayed on the double spread selected by the user. FIG. 4B shows a state in which a double spread including pages 7 and 8 is selected.

A purchased merchandise addition button 419 can add a photo album to a shopping cart (not shown) as merchandize when the user purchases it. Upon detecting the pressing of the purchased merchandise addition button 419 by the user, the application 80 adds the photo album displayed in the preview display portion 418 to the shopping cart. The user can purchase the photo album added to the shopping cart via an online order site shown in FIG. 4C, which is associated with the shopping cart, and a settlement site (not shown) that cooperates with the online order site. Note that the online order site, the settlement site, and the shopping cart are the same as a general online shopping site and a settlement site and a shopping cart cooperating with it, and a description thereof will be omitted.

Referring to FIG. 4C, a URL setting portion 421 accepts designation of the URL of a web site (page) that the user wants to display on the web browser 143. The URL of the web site (page) displayed on the web browser 143 is also displayed in the URL setting portion 421. A screen 422 is a photo album order screen displayed on the web browser 143. FIG. 4C shows an example in which the user orders a photo album of order number 4649. An order information display portion 423 displays information about order of the photo album. FIG. 4C shows an example as follows.

Order number: 4649
Photo album type: type-K
Price: ¥100,000

The user presses an order button 424, and inputs necessary information such as a name, an address, a telephone number, and a delivery destination in accordance with a screen displayed after that. When settlement is completed in the settlement site, the user can order the photo album created by the application 80 and purchase the album.

FIGS. 10A and 10B are views showing examples of the structures of photo albums. FIG. 10A shows an example of the structure of a photo album of type-K, and FIG. 10B shows an example of the structure of a photo album of type-M.

The photo album shown in FIG. 10A includes a front cover 1001, a back cover 1004, a double spread 1002 including pages 1 and 2 of the book body, and a double spread 1003 including pages 19 and 20 of the book body. In the photo album of type-K, the first page is the start page, and the 20th page is the last page concerning the book body.

The photo album shown in FIG. 10B is a photo album of type-M, which includes a front cover 1011, a back cover 1014, a double spread 1012 including pages 1 and 2 of the book body, and a double spread 1013 including pages 49 and 50 of the book body. In the photo album of type-M, the first page is the start page, and the 50th page is the last page concerning the book body.

Figure 11A:
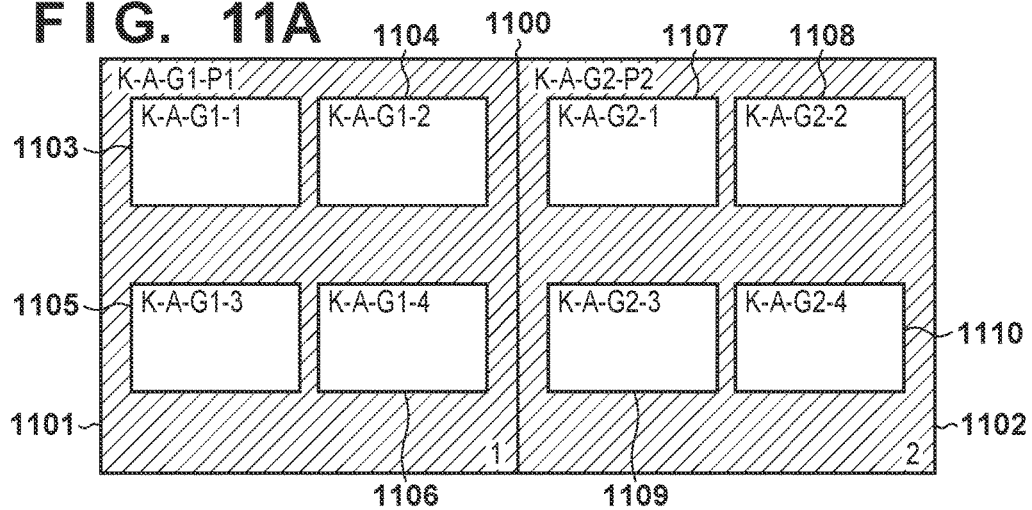
FIGS. 11A to 11C are views showing layout templates.
Figure 11B:
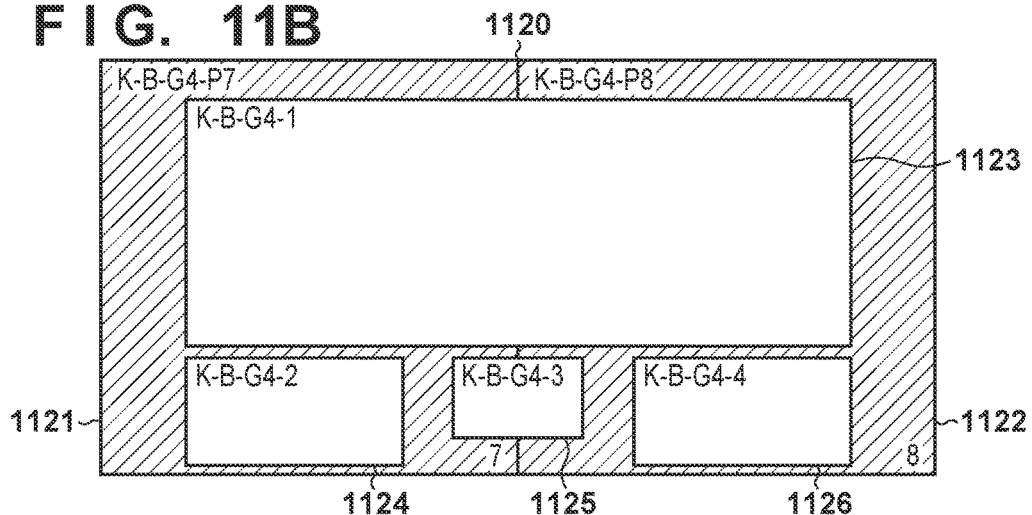
Figure 11C:
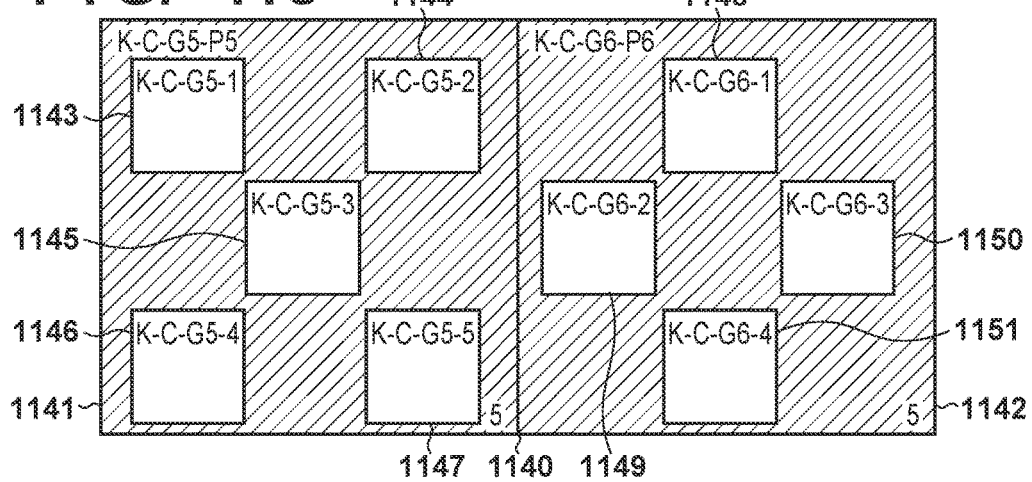

FIGS. 11A to 11C are views showing examples of layout templates (to be also referred to as templates hereinafter). FIG. 11A shows an example of a time base layout template of a photo album of type-K. FIG. 11B shows an example of a scene base layout template of a photo album of type-K. FIG. 11C shows an example of a theme base layout template of a photo album of type-K.

Referring to FIG. 11A, a template 1100 is, for example, the layout template of a double spread including pages 1 and 2 of the book body out of the time base layout template of a photo album of type-K. A template 1101 is the layout template of page 1 of the book body, and a template 1102 is the layout template of page 2 of the book body. Slots 1103, 1104, 1105, and 1106 are slots laid out on page 1 of the book body. The application 80 lays out still images in these slots.

The slots 1103, 1104, 1105, and 1106 belong to the region of group 1. A code K-A-G1-P1 added to the template 1101 represents the attribute of this template. K represents a photo album of type-K, A represents time base, G1 represents the region of group 1, and P1 represents page 1 of the book body. Codes K-A-G1-1, K-A-G1-2, K-A-G1-3, and K-A-G1-4 added to the slots 1103, 1104, 1105, and 1106 represent the attributes of these slots, respectively. K-A-G1 indicates the same contents as described above. The last number indicates the slot number. The slot number is assigned on a group basis.

Slots 1107, 1108, 1109, and 1110 are slots laid out on page 2 of the book body. The application 80 lays out still images in these slots. The slots 1107, 1108, 1109, and 1110 belong to the region of group 2. A code K-A-G2-P2 added to the template 1102 represents the attribute of this template. K-A indicates the same contents as described above. G2 represents the region of group 2, and P2 represents page 2 of the book body. Codes K-A-G2-1, K-A-G2-2, K-A-G2-3, and K-A-G2-4 added to the slots 1107, 1108, 1109, and 1110 represent the attributes of these slots, respectively. K-A-G2 indicates the same contents as described above. The last number indicates the slot number. The slot number is assigned on a group basis. FIG. 11A shows an example in which regions are put into groups on a page basis, and all slots in a group (a page on one side) belong to the region of the same group.

Referring to FIG. 11B, a template 1120 is, for example, the layout template of a double spread including pages 7 and 8 of the book body out of the scene base layout template of a photo album of type-K. A template 1121 is the layout template of page 7 of the book body, and a template 1122 is the layout template of page 8 of the book body. A slot 1124 is a slot laid out on page 7 of the book body, a slot 1126 is a slot laid out on page 8 of the book body, and slots 1123 and 1125 are slots laid out across pages 7 and 8 of the book body. The application 80 lays out still images in these slots.

The slots 1123, 1124, 1125, and 1126 belong to the region of group 4. A code K-B-G4-P7 added to the template 1121 and a code K-B-G4-P8 added to the template 1122 represent the attributes of these templates, respectively. K represents a photo album of type-K, B represents scene base, G4 represents the region of group 4, P7 represents page 7 of the book body, and P8 represents page 8 of the book body. Codes K-B-G4-1, K-B-G4-2, K-B-G4-3, and K-B-G4-4 added to the slots 1123, 1124, 1125, and 1126 represent the attributes of these slots, respectively. K-B-G4 indicates the same contents as described above. The last number indicates the slot number. The slot number is assigned on a group basis. FIG. 11B shows an example in which regions are put into groups on a double spread basis, and all slots in a group (double spread) belong to the region of the same group.

Referring to FIG. 11C, a template 1140 is, for example, the layout template of a double spread including pages 5 and 6 of the book body out of the theme base layout template of a photo album of type-K. A template 1141 is the layout template of page 5 of the book body, and a template 1142 is the layout template of page 6 of the book body. Slots 1143, 1144, 1145, 1146, and 1147 are slots laid out on page 5 of the book body. The application 80 lays out still images in these slots.

The slots 1143, 1144, 1145, 1146, and 1147 belong to the region of group 5. A code K-C-G5-P5 added to the template 1141 represents the attribute of this template. K represents a photo album of type-K, C represents theme base, G5 represents the region of group 5, and P5 represents page 5 of the book body. Codes K-C-G5-1, K-C-G5-2, K-C-G5-3, K-C-G5-4, and K-C-G5-5 added to the slots 1143, 1144, 1145, 1146, and 1147 represent the attributes of these slots, respectively. K-C-G5 indicates the same contents as described above. The last number indicates the slot number. The slot number is assigned on a group basis. Slots 1148, 1149, 1150, and 1151 are slots laid out on page 6 of the book body. The application 80 lays out still images in these slots.

The slots 1148, 1149, 1150, and 1151 belong to the region of group 6. A code K-C-G6-P6 added to the template 1142 represents the attribute of this template. K-C indicates the same contents as described above. G6 represents the region of group 6, and P6 represents page 6 of the book body. Codes K-C-G6-1, K-C-G6-2, K-C-G6-3, and K-C-G6-4 added to the slots 1148, 1149, 1150, and 1151 represent the attributes of these slots, respectively. K-C-G6 indicates the same contents as described above. The last number indicates the slot number. The slot number is assigned on a group basis. FIG. 11C shows an example in which regions are put into groups on a page basis, and all slots in a group (a page on one side) belong to the region of the same group.

Figure 12A:
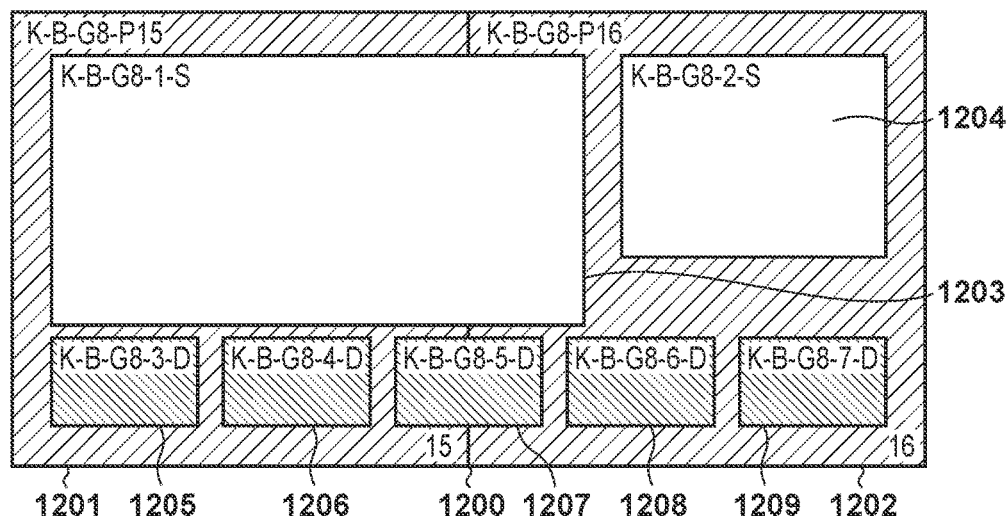
FIGS. 12A and 12B are views for explaining a method of managing slots of a layout template.
Figure 12B:
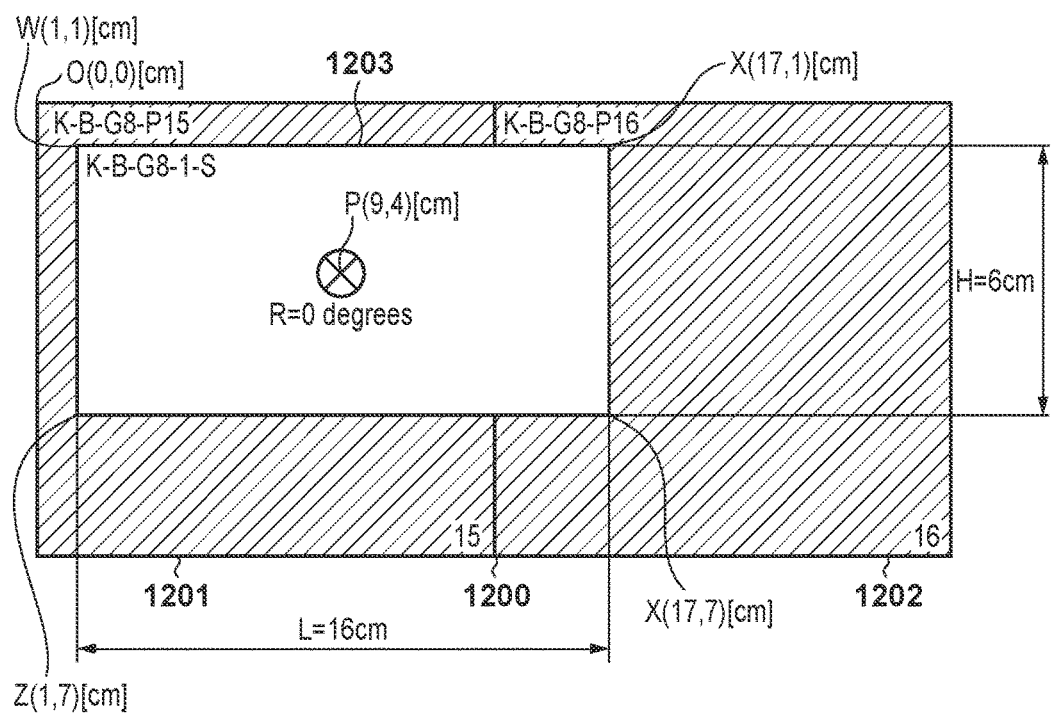

FIGS. 12A and 12B are views for explaining a layout template and slot management. FIG. 12A shows an example of the scene base layout template of a photo album of type-K, and FIG. 12B shows an example of the slot management method. FIG. 12A shows a template as an improved version of the layout template shown in FIG. 11B, and illustrates an example in which still images and still images extracted from a moving image are laid out in appropriate slots.

Referring to FIG. 12A, a template 1200 is the layout template of a double spread including pages 15 and 16 of the book body out of the scene base layout template of a photo album of type-K. A template 1201 is the layout template of page 15 of the book body, and a template 1202 is the layout template of page 16 of the book body. Slots 1205 and 1206 are slots laid out on page 15 of the book body, and slots 1204, 1208, and 1209 are slots laid out on page 16 of the book body. Slots 1203 and 1207 are slots laid out across pages 15 and 16 of the book body. The application 80 lays out still images in these slots.

The slots 1203, 1204, 1205, 1206, 1207, 1208, and 1209 belong to the region of group 8. A code K-B-G8-P15 added to the template 1201 and a code K-B-G8-P16 added to the template 1202 represent the attributes of these templates, respectively. K represents a photo album of type-K, B represents scene base, G8 represents the region of group 8, P15 represents page 15 of the book body, and P16 represents page 16 of the book body.

Codes (K-B-G8-1-S, and the like) added to the slots 1203, 1204, 1205, 1206, 1207, 1208, and 1209 represent the attributes of these slots, respectively. K-B-G8 indicates the same contents as described above. The next number indicates the slot number. The last letter indicates the attribute of an image to be laid out. S indicates an attribute representing that the slot is used for a general still image such as a photo shot by a digital still camera or the like and saved. D indicates an attribute representing that the slot is used for a still image extracted from a moving image by performing frame analysis or the like. For example, a code K-B-G8-1-S is added to the slot 1203. Since the image attribute is S, an image suitable for layout in this slot is a general still image. Additionally, for example, a code K-B-G8-3-D is added to the slot 1205. Since the image attribute is D, an image suitable for layout in this slot is a still image extracted from a moving image. The slot number is assigned on a group basis.

FIG. 12A shows an example in which regions are put into groups on a double spread basis, and all slots in a group (double spread) belong to the region of the same group. Note that if a general still image suitable for layout in the slot 1203 suitable for a general still image does not exist, a still image extracted from a moving image may be laid out in this slot. In addition, if a still image extracted from a moving image suitable for layout in the slot 1205 suitable for a still image extracted from a moving image does not exist, a general still image may be laid out in this slot.

In some cases, for example, a still image that is slightly out of focus and less appropriate for a photo album exists among a plurality of still images extracted from a moving image, and there exists a general still image whose quality is higher than that of the still image slightly out of focus. In this case as well, the still image slightly out of focus can effectively be laid out in a slot of attribute D suitable for a still image extracted from a moving image as one of continuous still images extracted from a moving image. That is, the plurality of continuous still images extracted from the moving image are laid out in the slots of attribute D suitable for a still image as a series of still images. This makes it possible to automatically create a dynamic photo album exploiting the feature of the layout template without a cumbersome operation of the user. It is also possible to provide a photo album creation application having a function of automatically generating an attractive photo album.

FIG. 12B is a view showing an example of the slot management method using the scene base layout template of a photo album of type-K. Slots other than the slot 1203 are not illustrated in FIG. 12B for the descriptive convenience because it focuses on the slot management method based on FIG. 12A. Referring to FIG. 12B, a point O is the reference point of the photo album. Using the upper left corner of the double spread of the photo album as the reference point, the application 80 defines the position of each slot and manages/controls the layout of an image in each slot. The application 80 defines the rightward direction from the point as a positive (+) abscissa, the leftward direction as a negative (−) abscissa, the downward direction as a positive (+) ordinate, and the upward direction as a negative (−) ordinate. The coordinates of each point are expressed as (abscissa, ordinate). For example, the coordinates of the point O are (0, 0) [unit: cm].

A point W is the reference point of the slot 1203, which matches the upper left corner of the slot. In this way, the reference point of each slot is set at the upper left corner of the slot. The point W is located 1 cm to the right and 1 cm to below the point O and has coordinates (1, 1) [unit: cm]. L is the width of the slot 1203, which is 16 cm. H is the height of the slot 1203, which is 6 cm. Hence, the points of the rectangle of the slot 1203 and their coordinates are a point X (17, 1) [unit: cm], a point Y (17, 7) [unit: cm], and a point Z (1, 7) [unit: cm]. A point P is the center of the slot 1203, whose coordinates are (9, 4) [unit: cm]. R is the rotation angle of the slot 1203. Since the slot 1203 is not rotated in the example of FIG. 12B, the rotation angle is 0°. In this way, the application 80 defines each slot laid out on the layout template using coordinates and a rotation angle, and uses the information when managing/controlling the slots. The pieces of defined information are managed like a table shown in FIG. 15.

FIGS. 13A to 13E are views showing examples of the relationship of layout between slots and still images. FIGS.

13A and 13B each show the relationship of layout between slots and still images on the template 1102. FIGS. 13C and 13D each show the relationship of layout between slots and still images on the template 1141. FIG. 13E shows the relationship of layout between slots and still images on the template 1200. In FIGS. 13A to 13E, Album Type is type of a photo album, Group is a region (group) number, Page is a page number, Slot is a slot number, and File is a file name. Referring to FIGS. 13A and 13B, slots of slot numbers 1 to 4 correspond to the slots 1107 to 1110, respectively. Referring to FIGS. 13C and 13D, slot numbers 1 to 5 correspond to the slots 1143 to 1147, respectively. Referring to FIG. 13E, slot numbers 1 to 7 correspond to the slots 1203 to 1209, respectively. In FIGS. 13A to 13E, static*.jpg is a general still image such as a photo shot by a digital still camera or the like and saved, and dynamic*.jpg (* is an arbitrary number) is a still image extracted from a moving image.

FIG. 14 is a view showing an example of the scores of still images. In FIG. 14, File is a file name, Elements are elements that define appropriateness (quality) as an image for a photo album, and Score is the general score of the elements. The score is an index that is derived from the points of the elements of Elements and indicates general appropriateness from the viewpoint of layout on a template.

Elements include Color, Contrast, Brightness, Focus, and Composition. Each element represents appropriateness as an image for a photo album by 0 (minimum) to 10 (maximum) points. The point of each element can be added based on a predetermined reference. For example, when the difference between the maximum value and the minimum value of brightness values in a still image corresponds to a predetermined level, a corresponding point may be added as a contrast point. For example, when a triangular composition based on an object in a still image corresponds to a predetermined level, a corresponding point may be added as a composition point. For example, when the sharpness of a change in the brightness distribution in a still image corresponds to a predetermined level, a corresponding point may be added as a focus point.

Original is an original score which is the average value of the points of Color, Contrast, Brightness, Focus, and Composition. Modified is a score obtained by modifying the original score. To express a weight representing the merit of a still image extracted from a moving image as a score, the application 80 increases the score by, for example, multiplying the original score by 1.2.

As for the merit, for example, the possibility that a still image extracted from a moving image is specified as a layout target for a template can be raised by making the original score value large. That is, as for still images extracted from a moving image, still images of higher quality can be acquired by re-executing extraction. Hence, the quality of a finally completed template can be improved.

When laying out a still image in each slot, the application 80 employs a higher one of the original score and the modified score and uses it to specify an image more appropriate as a layout target for the template. Note that in the above-described example, the original score of each still image extracted from a moving image is multiplied by 1.2, thereby increasing the score. The score of a still image extracted from a moving image is thus controlled to be relatively higher than the score of a general still image such as a photo shot by a digital still camera or the like and saved. However, the control method is not limited to this. For example, the score of the general still image such as a photo shot by a digital still camera or the like and saved may be multiplied by 0.8 to decrease the score. The score of the still image extracted from the moving image may thus be controlled to be relatively higher than the score of the general still image such as a photo shot by a digital still camera or the like and saved. In FIG. 14, "–" represents absence of data.

FIG. 15 is a view showing an example of the positions of the slots. Referring to FIG. 15, Slot is the slot number, Reference Point representing the reference point of a slot Length is the width of the slot, Height is the height of the slot, and Rotation is the rotation angle of the slot. FIG. 15 shows an example of the positions of the slots 1203 to 1209 of the layout template 1200 shown in FIG. 12A.

FIGS. 17A and 17B are views showing examples of association between still images and moving images and classification of still images. FIG. 17A shows an example according to this embodiment, and FIG. 17B shows an example according to the second embodiment to be described later. In FIGS. 17A and 17B, JPEG is the file name of a still image, MPEG is the file name of an MPEG moving image, Date & Time is the shooting date/time, Info is information about classification, and Group is a classification result. Frame is a frame number of a moving image, Related File is the file name of a file (moving image file/still image file) associated with a still image file or a moving image file. A still image file described in a JPEG cell is a still image file that is extracted from a moving image file described in the MPEG column of the same row and saved. The format of Date & Time is year/month/day and time ($1/1000$ sec). For example, "20140330100010334" described in the Date & Time cell of the row of dynamic15.jpg in FIG. 17A represents Mar. 30, 2014, 10:00 and 334/1000 sec. In FIGS. 17A and 17B, "–" represents absence of data.

Figure 5:
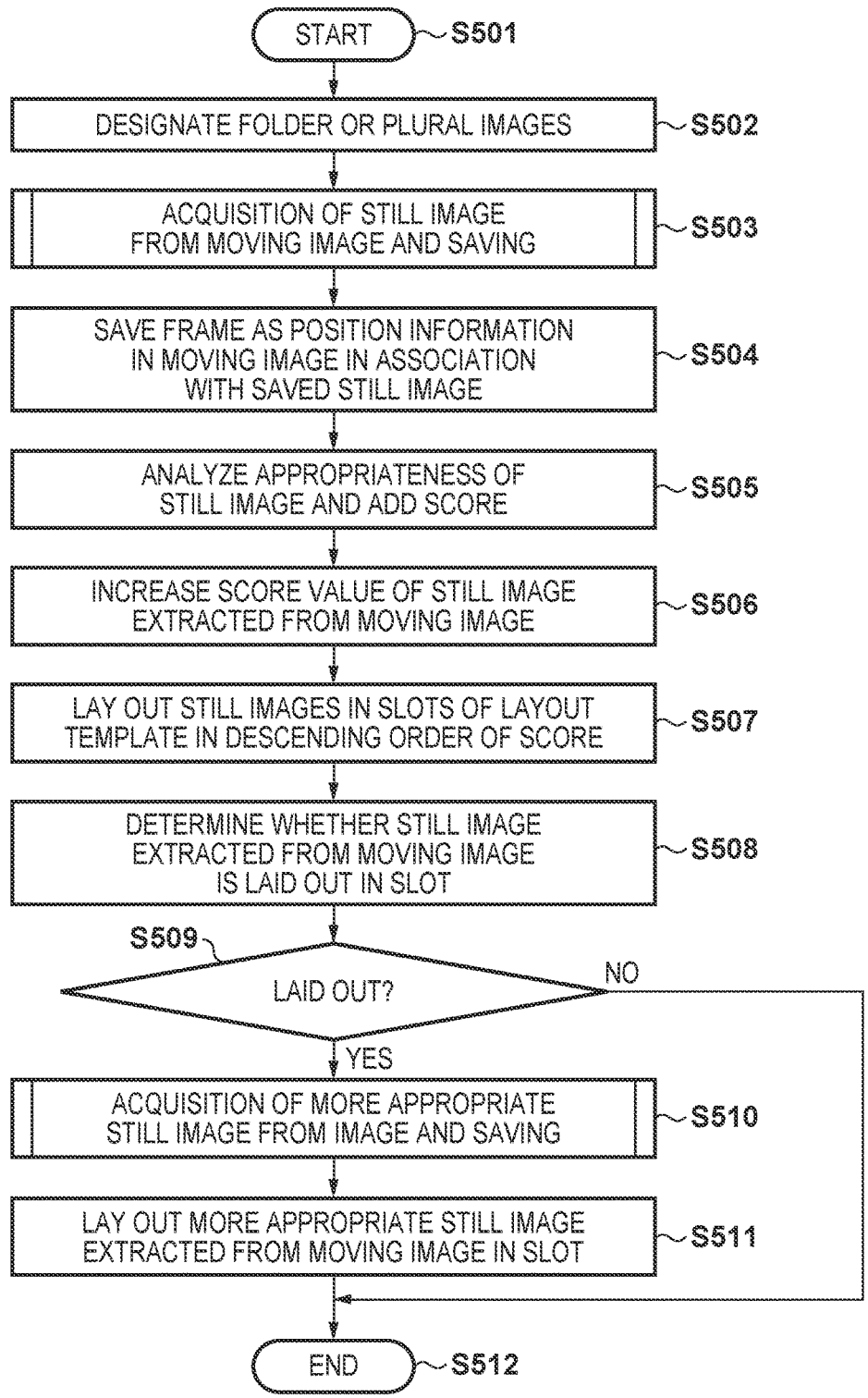
FIG. 5 is a flowchart showing automatic photo album creation processing.

FIG. 5 is a flowchart showing processing of automatically creating a photo album. A program according to the flowchart of FIG. 5 is stored in, for example, the HDD 202, read out to the RAM 201, and executed by the CPU 204. When the user selects the auto selection button 407 shown in FIG. 4A and presses the photo album creation button 412, the application 80 executes the processing from step S501 in accordance with the flowchart shown in FIG. 5. In step S502, the application 80 selects a folder (not shown) in the PC 1, which stores still image files or moving image files, or still image files or moving image files in the PC 1, and designates the folder or files as the storage destination of an image group or an image group necessary when creating a photo album. Note that in step S502, the user may be caused to select a folder in the PC 1, which stores still images or moving images, or still image files or moving image files in the PC 1.

Figure 16B:
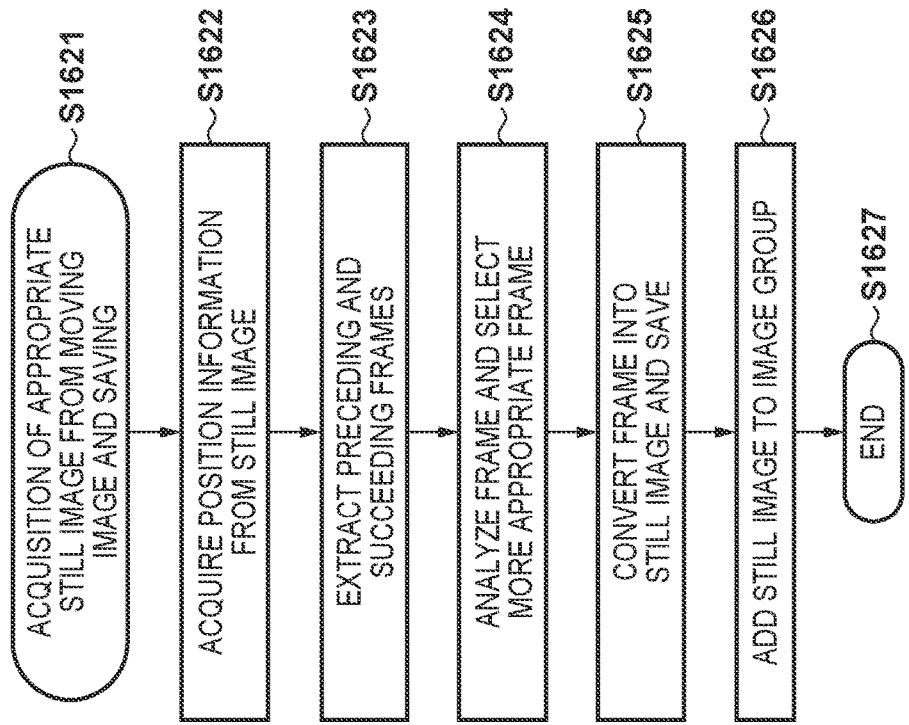
FIGS. 16A and 16B are flowcharts showing processing of acquiring a still image from a moving image.
Figure 16A:
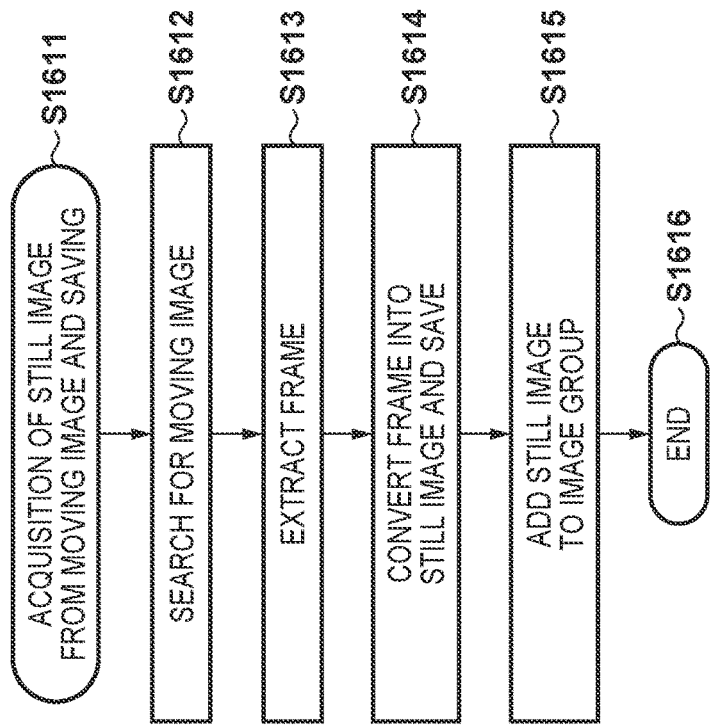

In step S503, the application 80 executes processing, shown in FIG. 16A, of acquiring a still image from a moving image file and saving it. In step S504, for the still image saved in step S503, the application 80 saves the position information (frame number) of a frame in the moving image, which is the base of the still image, in association with the still image, as shown in, for example, FIG. 17A.

In step S505, concerning each still image in the image group necessary when creating a photo album, the application 80 analyzes each element shown in FIG. 14 which represents appropriateness as an image for a photo album. A score is calculated and added to each still image as an evaluation value representing the appropriateness of each element. Images to which scores are added here are the still images in the still image file and the still images saved in step S503. Note that in step S505, scores are added to both still images in the still image file and still images extracted from the moving image file. In step S505, the application 80 also adds a score to each still image extracted from the moving image, which is added in step S503, in accordance with the appropriateness of each element as an image for a photo album.

In step S506, the application 80 modifies the score of each still image extracted from the moving image. In step S506, to express a weight representing the merit of each still image extracted from the moving image as a score, the application 80 increases the score by, for example, multiplying the original score by 1.2. When laying out a still image in each slot, the application 80 employs a higher one of the original score and the modified score shown in FIG. 14. The application 80 then lays out, in the slots, still images as many as the slots in the template.

When the application 80 executes processing shown in FIG. 16B for each still image extracted from the moving image by executing the processing shown in FIG. 16A, still images more appropriate as images for a photo album can be extracted. Hence, the application 80 increases the score by multiplying the original score of each still image extracted from the moving image by 1.2 as a weight corresponding to the merit.

The processing of laying out an image in each slot and creating a photo album will be described below using the layout template 1100 shown in FIG. 11A as an example. In step S507, the application 80 lays out still images in the slots of layout templates for a photo album of type-K, including the layout template 1100, in descending order of score.

In step S508, the application 80 determines whether a still image extracted from the moving image is laid out in a slot. Upon determining, in step S509, that a still image extracted from the moving image is laid out in at least one of the slots, the application 80 advances to step S510. Upon determining that a still image extracted from the moving image is not laid out in any slot, the application 80 advances to step S512 to end the processing shown in FIG. 5.

Assume that in step S507, static1.jpg, static2.jpg, static3.jpg, and dynamic20.jpg as a still image extracted from a moving image are laid out in the slots 1107 to 1110, as shown in FIG. 13A, based on the scores shown in FIG. 14. In step S510, the application 80 executes processing, shown in FIG. 16B, of acquiring a still image more appropriate as a layout target on the template from the moving image and saving the still image based on dynamic20.jpg laid out in the slot 1110. Based on position information (frame number) associated with the still image dynamic20.jpg, all frames included within a predetermined range of a predetermined time (for example, a total of 2 sec including 1 preceding sec and 1 succeeding sec) before and after that position are analyzed, and a frame more appropriate for a photo album is extracted.

At this time, to extract a more appropriate frame, the application 80 performs scoring of each frame image using the elements shown in FIG. 14 and employs a frame of a higher original score. The application 80 extracts a frame more appropriate for a photo album and saves the extracted frame as a still image dynamic24.jpg.

In step S511, the application 80 removes, from the slot 1110, the still image dynamic20.jpg laid out in the slot 1110. Instead, the application 80 lays out the still image dynamic24.jpg more appropriate for a photo album, which is saved in step S510, in the slot 1110. As a result, the images shown in FIG. 13B are laid out in the slots 1107, 1108, 1109, and 1110. In step S512, the application 80 ends the processing of automatically creating a photo album and displays the preview/editing screen 415 shown in FIG. 4B.

As described above, it is possible to provide a photo album creation application that handles both a still image and a moving image together and automatically extracts and lays out a more appropriate image without a cumbersome operation of the user.

In the above-described example, in step S506, the original score of the still image extracted from the moving image is multiplied by 1.2, thereby increasing the score. Controlling to make the score of the still image extracted from the moving image relatively higher than the score of a general still image such as a photo shot by a digital still camera or the like and saved is thus implemented. However, the present invention is not limited to this control method. For example, the application 80 may multiply the score of a general still image such as a photo shot by a digital still camera or the like and saved by 0.8 to decrease the score. The score of the still image extracted from the moving image may be controlled to be relatively higher than the score of the general still image such as a photo shot by a digital still camera or the like and saved.

In the above-described example, in step S506, the original score of the still image extracted from the moving image is multiplied by 1.2 to increase the score, or the score of a general still image such as a photo shot by a digital still camera or the like and saved is multiplied by 0.8 to decrease the score. However, the present invention is not limited to these examples. For example, upon determining that quality based on the resolution and the like of the moving image is high, the original score of a still image extracted from the moving image may be multiplied by 1.5. In this case, if the resolution is equal to or more than a reference value, the quality may be determined to be high. In addition, if quality based on the resolution and the like of a general still image such as a photo shot by a digital still camera or the like and saved is low, the original score of the still image may be multiplied by 0.5. With this arrangement, a score value representing appropriateness as an image for a photo album can flexibly be controlled.

In the above-described example, after a score is added to a still image in step S505, the score is modified in step S506. However, the present invention is not limited to this. In step S505, processing may be performed to add a high score to a still image extracted from a moving image. For example, a first evaluation criterion to readily add a high score and a second evaluation criterion to readily add a score lower than that of the first evaluation criterion are stored in the HDD 202. In step S505, the CPU 204 may add a score to the still image extracted from the moving image based on the first evaluation criterion and add a score to each still image other than the still image based on the second evaluation criterion.

Note that in the above-described example, in step S511, the still image dynamic20.jpg laid out in the slot 1110 is removed from the slot 1110, and the still image dynamic24.jpg more appropriate for a photo album, which is saved in step S510, is laid out in the slot 1110 instead. However, the present invention is not limited to this control method. For example, by the original score of the still image dynamic24.jpg, the relationship of layout between slots and still images on the template 1102 shown in FIG. 13B may be reviewed. For example, assume that the original score of dynamic24.jpg is 7.5. In this case, the score (=original score) of dynamic24.jpg 24 is higher than the original score (7.0) of static3.jpg. Hence, the application 80 lays out dynamic24.jpg in slot 3 shown in FIG. 13B and static3.jpg in slot 4 shown in FIG. 13B.

FIGS. 16A and 16B are flowcharts showing processing of acquiring a still image from a moving image and saving the still image. FIGS. 16A and 16B illustrate details of processing in step S503. Programs according to the flowcharts of FIGS. 16A and 16B are stored in, for example, the HDD 202, read out to the RAM 201, and executed by the CPU 204. FIG. 16A is a flowchart showing an example of processing of acquiring a still image from a moving image and saving the still image. FIG. 16B is a flowchart showing processing of acquiring a more appropriate still image from a moving image and saving the still image.

In step S503 of FIG. 5, the application 80 executes the processing of acquiring a still image from a moving image and saving the still image. Then, the application 80 starts processing from step S1611 of FIG. 16A. In step S1612, the application 80 searches for a still image or a moving image stored in the folder designated in step S502 of FIG. 5 or a moving image from the image group designated in step S502 of FIG. 5.

In step S1613, the application 80 extracts a plurality of frames from the found moving image at a time interval designated in the frame extraction time interval designation portion 413 shown in FIG. 4A. The time interval designated in the frame extraction time interval designation portion 413 is 1 sec that is the default value. In step S1614, the application 80 converts each extracted frame into a still image (JPEG file), and saves the still images. Note that at this time, the still image need not always be saved as a file. Instead, the CPU 204 may store the still image in the RAM 201 in, for example, the bitmap format. At this time, as shown in FIG. 17A, the application 80 stores each still image in association with the file name of the moving image from which the still image has been extracted and the position information (frame number) of a frame as the base of the still image. The information of the file of the moving image from which the still image has been extracted includes the full path of the storage destination. However, FIG. 17A does not illustrate the full path of the storage destination.

In step S1615, the application 80 adds these still images to the image group necessary when creating a photo album. In step S1616, the application 80 ends the processing shown in FIG. 16A and returns to the invocation source of the processing.

Assume that in step S507, the still image files static1.jpg, static2.jpg, static3.jpg, and dynamic20.jpg are laid out in the slots 1107 to 1110, as shown in FIG. 13A, based on the scores shown in FIG. 14. Here, the still image file dynamic20.jpg is a file saved based on a frame extracted from a moving image file video1.mp4, as shown in FIG. 17A. Note that video1.mp4 is a moving image file of MPEG4 format, and its frame rate is 30 fps (frames/sec).

When processing of acquiring a more appropriate still image from the moving image and saving the still image is executed in step S510 of FIG. 5, the application 80 starts the processing shown in FIG. 16B from step S1621 based on the still image dynamic20.jpg extracted from the moving image and laid out in the slot 1110. The processing shown in FIG. 16B is processing of acquiring a still image more appropriate as a layout target for the template from the moving image and saving the still image. In step S1622, the application 80 acquires position information (frame number) associated with the still image dynamic20.jpg. In step S1623, based on the position information (frame number), the application 80 extracts all frames included within a predetermined range of a predetermined time (for example, a total of 2 sec including 1 preceding sec and 1 succeeding sec) before and after that position.

In step S1624, the application 80 analyzes all extracted frames and selects a frame more appropriate for a photo album. At this time, to select a more appropriate frame, the application 80 performs storing of each frame image using the elements shown in FIG. 14 and selects a frame of a higher original score. For example, the frame of the highest original score is selected out of the extracted frames.

In step S1625, the application 80 converts the selected frame into a still image (JPEG file), and saves the still image. Here, the application 80 selects a frame more appropriate for a photo album based on the still image dynamic20.jpg, and saves the selected frame as a still image dynamic24.jpg. In step S1627, the application 80 ends the processing shown in FIG. 16B and returns to the invocation source of the processing.

According to the above-described processing, when laying out still images on a template, a high score is readily added to a still image extracted from a moving image, and the still image is readily laid out on the template.

For example, when a scene is shot by a camera as a still image, the shot image is acquired at the timing at which the user presses the shutter button. Hence, if the image is out of focus at that timing, the image blurs. On the other hand, in a moving image, a number of images (still images) are shot for one scene. Hence, an appropriate image with little blur may be included in the number of images.

According to the above-described processing, high scores are preferentially added to a plurality of still images extracted from a moving image. Out of the plurality of still images, images of high evaluation are laid out. It is therefore possible to lay out appropriate images with little blur.

Second Embodiment

FIG. 18 is a view showing examples of frames of a moving image. FIG. 18 shows an example of a moving image file video444.mp4. Referring to FIG. 18, a number added under each frame is the frame number of the frame. Dynamic44.jpg, dynamic45.jpg, and dynamic46.jpg are still image files that an application 80 has extracted from frames 3, 4, and 5 of video444.mp4, respectively, and saved. Dynamic54.jpg, dynamic55.jpg, and dynamic56.jpg are still image files that the application 80 has extracted from frames 925, 926, and 927 of video444.mp4, respectively, and saved. Dynamic87.jpg, dynamic88.jpg, and dynamic89.jpg are still image files that the application 80 has extracted from frames 3334, 3335, and 3336 of video444.mp4, respectively, and saved. As shown in FIG. 18, frames 1 to 5, frames 924 to 928, and frames 3333 to 3337 are frame groups of different scenes.

For a scene, still images are classified based on an object included in the still images. For example, if the type of an object included in still images changes, the scene is discriminated as a different scene. Scene discrimination may be done based on another criterion. For example, scenes may be discriminated by the same or similar composition.

Figure 6:
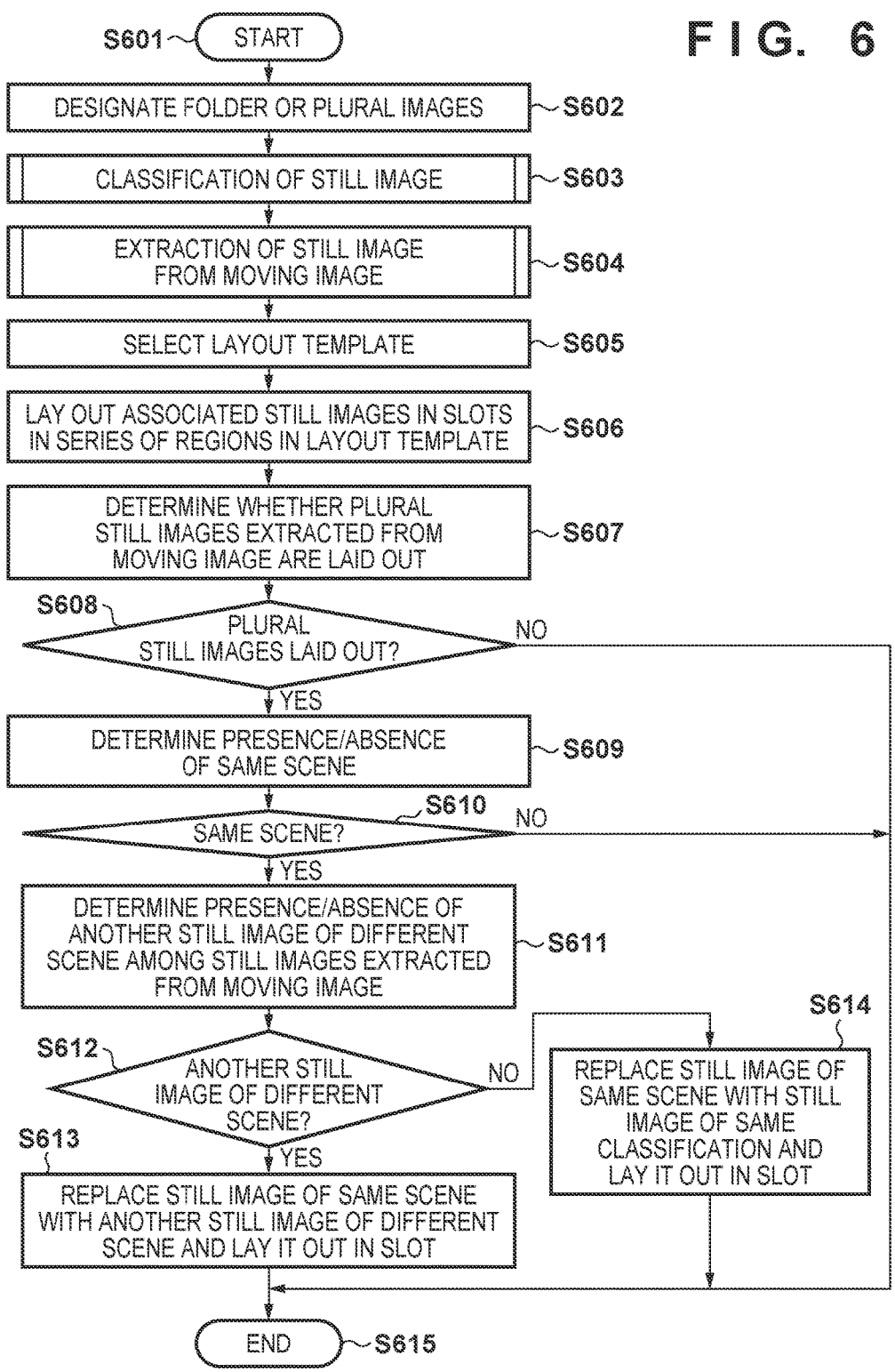
FIG. 6 is a flowchart showing automatic photo album creation processing.

FIG. 6 is a flowchart showing processing of automatically creating a photo album. A program according to the flowchart of FIG. 6 is stored in, for example, an HDD 202, read out to a RAM 201, and executed by a CPU 204. The user selects one of a time selection button 408, a scene selection button 409, and a theme selection button 410 shown in FIG. 4A, and presses a photo album creation button 412. In response to the pressing, the application 80 executes the processing from step S601 in accordance with the flowchart shown in FIG. 6. In step S602, the application 80 selects a folder (not shown) in a PC 1, which stores still images or moving images, or still images or moving images in the PC 1, and designates the folder or files as the storage destination of an image group or an image group necessary when creating a photo album. Note that in step S602, the user may be caused to select a folder in the PC 1, which stores still images or moving images, or still images or moving images in the PC 1.

Figure 7:
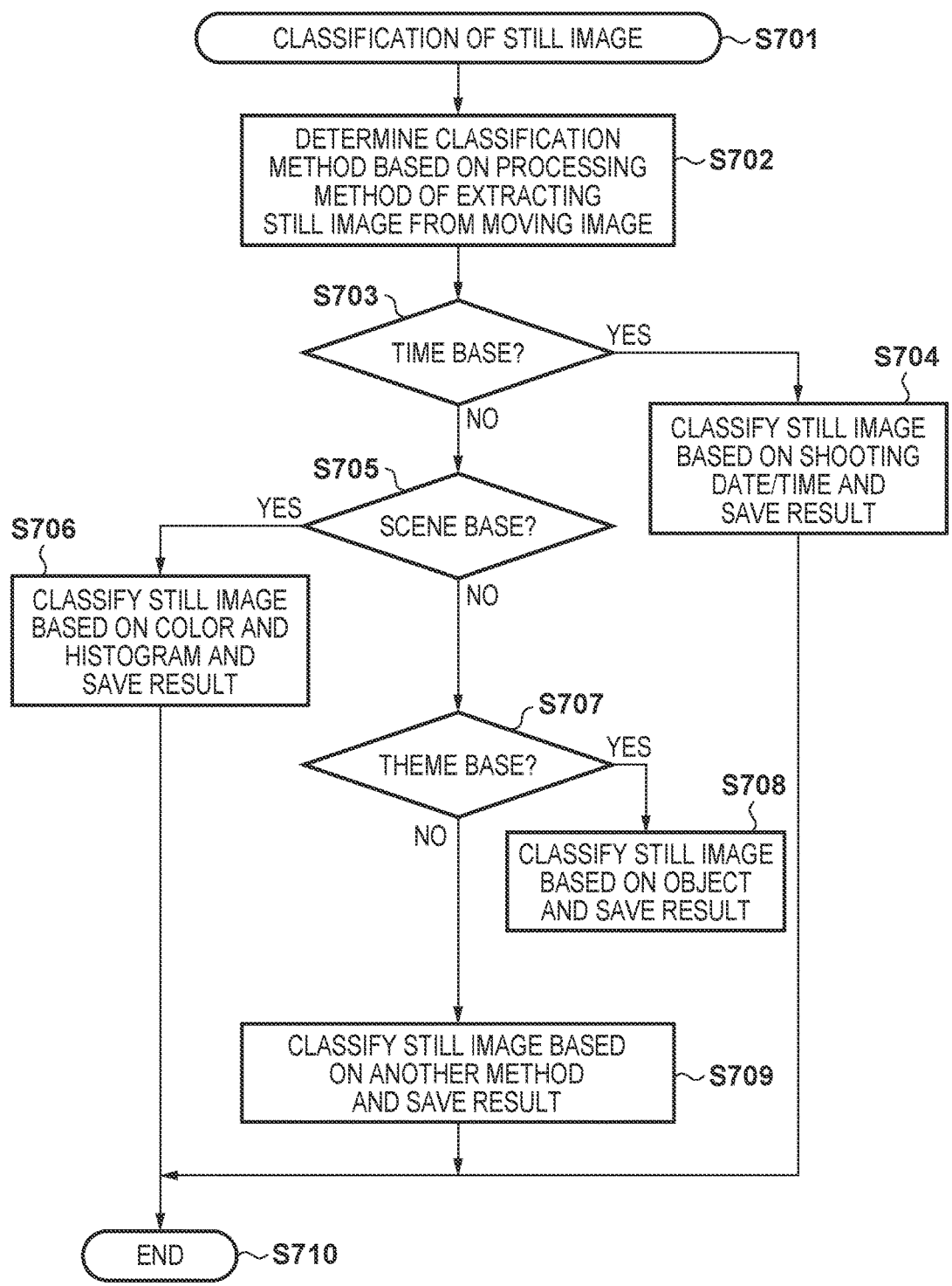
FIG. 7 is a flowchart showing still image classification processing.

In step S603, the application 80 executes still image classification processing shown in FIG. 7. In step S604, according to a classification method (time base, scene base, or theme base) in the still image classification processing of step S603, the application 80 executes processing shown in FIG. 8A, 8B, or 8C corresponding to the method. Each of the processes shown in FIGS. 8A, 8B, and 8C is processing of extracting a still image from a moving image in correspondence with classification. Note that as for the classification method, this embodiment includes not only a case in which one of the time base, the scene base, and the theme base is applied but also a case in which some of the methods are applied in combination.

In step S605, based on the classification method applied in step S603, the application 80 selects a layout template associated with the classification method. Assume that the application 80 selects the theme base classification method in step S603. In step S605, the application 80 selects a layout template associated with the theme base classification method. Assume that the application 80 selects a layout template including a layout template 1140 shown in FIG. 11C.

In step S606, the application 80 lays out still images associated with each other in slots within a series of regions associated in the layout template. At this time, if the number of still images classified by the classification (for example, theme) is larger than a predetermined number of slots in the series of regions, scoring as described in the first embodiment may be performed, and the still images may be assigned to the predetermined number of slots in descending order of score.

In step S607, the application 80 confirms the still images laid out in the slots, and determines whether a plurality of still images extracted from a moving image are laid out. Upon determining in step S608 that a plurality of still images are laid out, the application 80 advances to step S609. Upon determining that a plurality of still images are not laid out, the application 80 advances to step S615 to end the processing shown in FIG. 6.

Assume that still image files static14.jpg, static28.jpg, dynamic44.jpg, dynamic45.jpg, and dynamic46.jpg are laid out in slots 1143 to 1147, as shown in FIG. 13C. In step S609, the application 80 determines whether images of the same scene are included in the plurality of still images extracted from a moving image and laid out. Upon determining in step S610 that images of the same scene are included, the application 80 advances to step S611. Upon determining that images of the same scene are not included, the application 80 advances to step S615 to end the processing shown in FIG. 6.

In step S611, the application 80 determines the presence/absence of another still image of a different scene out of the still images extracted from the moving image. Upon determining in step S612 that another still image of a different scene exists, the application 80 advances to step S613. Upon determining that another still image of a different scene does not exist, the process advances to step S614.

In step S613, the application 80 replaces one of the still images of the same scene laid out in the slots out of the still images extracted from the moving image with the other still image of the different scene extracted from the moving image, and lays out the still image of the different scene in the slot. As a result, the still image dynamic45.jpg laid out in the slot 1146 is replaced with a still image dynamic55.jpg, and the still image dynamic46.jpg laid out in the slot 1147 is replaced with a still image dynamic88.jpg. As shown in FIG. 13D, still image files static14.jpg, static28.jpg, dynamic44.jpg, dynamic55.jpg, and dynamic88.jpg are laid out in the slots 1143 to 1147, respectively.

In step S614, the application 80 replaces one of the still images of the same scene laid out in the slots out of the still images extracted from the moving image with a still image of the same classification, which is not a still image extracted from the moving image, and lays out the still image in the slot. At this time, the replacement may be done such that the score value shown in FIG. 14 becomes large. Alternatively, the replacement may be done such that the point of one of the elements shown in FIG. 14 becomes large. As a result, the quality of a finally completed template can be improved. In step S615, the application 80 ends the processing of automatically creating a photo album shown in FIG. 6 and displays a preview/editing screen 415 shown in FIG. 4B.

FIG. 7 is a flowchart showing still image classification processing. A program according to the flowchart of FIG. 7 is stored in, for example, the HDD 202, read out to the RAM 201, and executed by the CPU 204. When the application 80 executes still image classification processing in step S603 of FIG. 6, the application 80 starts the still image classification processing from step S701 of FIG. 7.

In step S702, the application 80 acquires the selection state of a moving image file processing method selection portion 406 by the user, and determines the classification method based on the processing method of extracting a still image from a moving image, which is selected by the user. Upon determining in step S703 that the classification method is the time base classification method, the application 80 advances to step S704. Upon determining that the classification method is not the time base classification method, the application 80 advances to step S705.

In step S704, the application 80 refers to the Date Time information of Exif information of a still image (JPEG file), the creation date, updating date/time, and access date/time of the still image file, and the like, and classifies the still image based on a shooting date/time obtained from these pieces of information. The classification information and the classification result (group) are saved in association with the target still image. At this time, if the Date Time information of Exif information does not exist, the application 80 saves a shooting date/time obtained from the creation date, updating date/time, and access date/time of the file, and the like in association with the still image.

As the classification method, for example, a method of putting still images of the same day together into the same classification or putting still images of the same time information, for example, the same month together into the same classification is usable. For example, the row of static102.jpg shown in FIG. 17B indicates a case in which the classification is done by this method. Information representing that the still image is classified by a time between 20:00 and 21:00 (20:00 to 20:59) in Dec. 24, 2013 is stored in Info (classification information) in association with static102.jpg.

Upon determining in step S705 that the classification method is the scene base classification method, the application 80 advances to step S706. Upon determining that the classification method is not the scene base classification method, the application 80 advances to step S707.

In step S706, the application 80 analyzes the color information, histogram, and the like of a still image, classifies the still image based on the analysis result, and saves the classification information and the classification result (group) in association with the target still image. At this time, the application 80 also saves the color information and the histogram information in association with the still image. As the classification method, for example, a method of putting still images of similar tints together into the same classification or putting still images whose RGB or YCrCb histograms are coincident or whose chromaticities fall within a predetermined threshold range together into the same classification is usable. For example, the row of static120.jpg shown in FIG. 17B indicates a case in which the classification is done by this method. Information representing that the still image is classified by histogram 4 (histogram4-*, * is a natural number representing a histogram value determined as a group of histogram 4) is stored in Info (classification information) in association with static120.jpg.

Upon determining in step S707 that the classification method is the theme base classification method, the application 80 advances to step S708. Upon determining that the classification method is not the theme base classification method, the application 80 advances to step S709.

In step S708, the application 80 analyzes an object included in a file selected by the user using a file selection button 411, and classifies the still image based on the analysis result. The classification information and the classification result (group) are saved in association with the target still image. At this time, the application 80 also saves the object information in association with the still image. Examples of objects are a pet such as a dog and a cat, a flower, a train, a car, a motorcycle, and the like. Note that a human (a person, a face, or the like) is also included in examples of objects. For example, the row of static155.jpg shown in FIG. 17B indicates a case in which the classification is done by this method. Information representing that the still image is classified by object 8 (object8-*, * is a natural number representing information that defines an object determined as a group of object 8) is stored in Info (classification information) in association with static155.jpg.

In step S709, the application 80 classifies the still image based on another method, and saves the result in association with the target still image. At this time, the application 80 also saves the information of the other method in association with the still image. Note that when the user operates a main screen 401 according to this embodiment, the application 80 does not execute the processing of step S709 in some cases. In step S710, the application 80 ends the still image classification processing shown in FIG. 7 and returns to the invocation source of the processing.

FIGS. 8A to 8C are flowcharts showing processing of extracting a still image from a moving image. A program according to each of the flowcharts of FIGS. 8A to 8C is stored in, for example, the HDD 202, read out to the RAM 201, and executed by the CPU 204. FIG. 8A is a flowchart showing processing of extracting a still image from a moving image on the time base. FIG. 8B is a flowchart showing processing of extracting a still image from a moving image on the scene base. FIG. 8C is a flowchart showing processing of extracting a still image from a moving image on the theme base.

Assume that the user selects the time selection button 408 shown in FIG. 4A, and presses the photo album creation button 412. In this case, when the application 80 executes processing of extracting a still image from a moving image in step S604 of FIG. 6, the application 80 starts the processing of extracting a still image from a moving image in step S811 of FIG. 8A.

In step S812, based on classification information associated with a still image in step S704 and the Date Time information of Exif information of the still image or a shooting date/time associated with the still image, the application 80 extracts an associated frame from a moving image. At this time, the application 80 acquires the shooting date/time of the moving image first, and specifies a moving image with a coincident classification using the classification information (for example, same day and same month) associated with the still image obtained in step S704. The classification information is saved in association with the specified moving image. Next, the application 80 acquires the Date Time information of Exif information or a shooting date/time associated with the still image from a still image of the same classification, and extracts a frame with a coincident shooting date/time from the moving image of the same classification. At this time, using the shooting date/time as a reference time, the application 80 analyzes all frames included within a predetermined range of a predetermined time (for example, a total of 6 sec including 3 preceding sec and 3 succeeding sec) before and after the shooting date/time, and extracts a frame more appropriate for a photo album.

The application 80 may extract a plurality of frames. At this time, to extract a more appropriate frame, the application 80 performs scoring of each frame image using the elements shown in FIG. 14 and employs the frames in descending order of original score. As for the number of frames to be employed, for example, the number of slots capable of laying out still images extracted from a moving image may be determined as the number of frames to be employed.

In step S813, the application 80 saves the frame extracted in step S812 as a still image. Note that if a frame with a coincident shooting date/time does not exist in step S812, a still image is extracted by executing the processing shown in FIG. 16A for the moving image.

In step S814, the application 80 saves the classification information, the classification result, and the associated file in association with the still image extracted from the moving image. For example, the row of dynamic301.jpg shown in FIG. 17B indicates this case. Information representing that the still image is classified by a time between 20:00 and 21:00 (20:00 to 20:59) in Dec. 24, 2013 is stored in Info (classification information) in association with the still image. In addition, group information date Time 1 is stored in Group (classification result) in association with the still image. Furthermore, static102.jpg is stored in Related File (associated file) in association with the still image. In step S815, the application 80 ends the processing shown in FIG. 8A and returns to the invocation source of the processing.

Assume that the user selects the scene selection button 409 shown in FIG. 4A, and presses the photo album creation button 412. In this case, when the application 80 executes processing of extracting a still image from a moving image in step S604 of FIG. 6, the application 80 starts the processing of extracting a still image from a moving image in step S821 of FIG. 8B.

In step S822, based on classification information such as color information or histogram associated with a still image in step S706 of FIG. 7, the application 80 extracts an associated frame from a moving image. At this time, the application 80 extracts a frame from each moving image, analyses the color information, histogram, and the like of the frame, and compares them with the classification information (color information, histogram, and the like) associated with the still image obtained in step S706 of FIG. 7. As a result, if the pieces of classification information are coincident or similar, the classification information is saved in association with the moving image. The application 80 also saves the classification information in association with the frame with the coincident classification information. The application 80 analyzes all frames with coincident classification information, and extracts a frame appropriate for a photo album. The application 80 may extract a plurality of frames. Extraction of an appropriate frame (the order of score and the number of frames to be employed) is performed based on the same reference as in FIG. 8A. In step S823, the application 80 saves the frame extracted in step S822 as a still image.

In step S824, the application 80 saves the classification information, the classification result, and the associated file in association with the still image extracted from the moving image. For example, the row of dynamic321.jpg shown in FIG. 17B indicates this case. Information representing that the still image is classified by histogram 4 (histogram4-*, * is a natural number representing a histogram value determined as a group of histogram 4) is stored in Info (classification information) in association with the still image. In addition, group information histogram 4 is stored in Group (classification result) in association with the still image. Furthermore, static120.jpg is stored in Related File (associated file) in association with the still image. In step S825, the application 80 ends the processing shown in FIG. 8B and returns to the invocation source of the processing.

Assume that the user selects the theme selection button 410 shown in FIG. 4A, and presses the photo album creation button 412. In this case, when the application 80 executes processing of extracting a still image from a moving image in step S604 of FIG. 6, the application 80 starts the processing of extracting a still image from a moving image in step S831 of FIG. 8C.

In step S832, based on the classification information of an object associated with a still image in step S708 of FIG. 7, the application 80 extracts an associated frame from a moving image. At this time, the application 80 extracts a frame from each moving image, analyses an object included in the frame, and compares it with the classification information (object) associated with the still image obtained in step S708 of FIG. 7. As the result of comparison, if the pieces of classification information are coincident or similar, the classification information is saved in association with the moving image. The application 80 also saves the classification information in association with the frame with the coincident classification information. The application 80 analyzes all frames with coincident classification information, and extracts a frame appropriate for a photo album. The application 80 may extract a plurality of frames. Extraction of an appropriate frame (the order of score and the number of frames to be employed) is performed based on the same reference as in FIG. 8A.

In step S833, the application 80 saves the frame extracted in step S832 as a still image. In step S834, the application 80 saves the classification information, the classification result, and the associated file in association with the still image extracted from the moving image. For example, the row of dynamic341.jpg shown in FIG. 17B indicates this case. Information representing that the still image is classified by object 8 (object8-*, * is a natural number representing information that defines an object determined as a group of object 8) is stored in Info (classification information) in association with the still image. In addition, group information object 8 is stored in Group (classification result) in association with the still image. Furthermore, static155.jpg is stored in Related File (associated file) in association with the still image. In step S835, the application 80 ends the processing shown in FIG. 8C and returns to the invocation source of the processing.

As described above, based on a classified still image, a still image associated with the still image is automatically extracted from a moving image, and the still images are laid out in a series of regions in a layout. This makes it possible to provide a photo album creation application that automatically extracts appropriate associated images from a moving image and lays out them without a cumbersome operation of the user. It is also possible to provide a photo album creation application that extracts a plurality of still images of different scenes from one moving image and lays out them in a series of regions, thereby automatically extracting a variety of images and laying out them without a cumbersome operation of the user.

Third Embodiment

Figure 9:
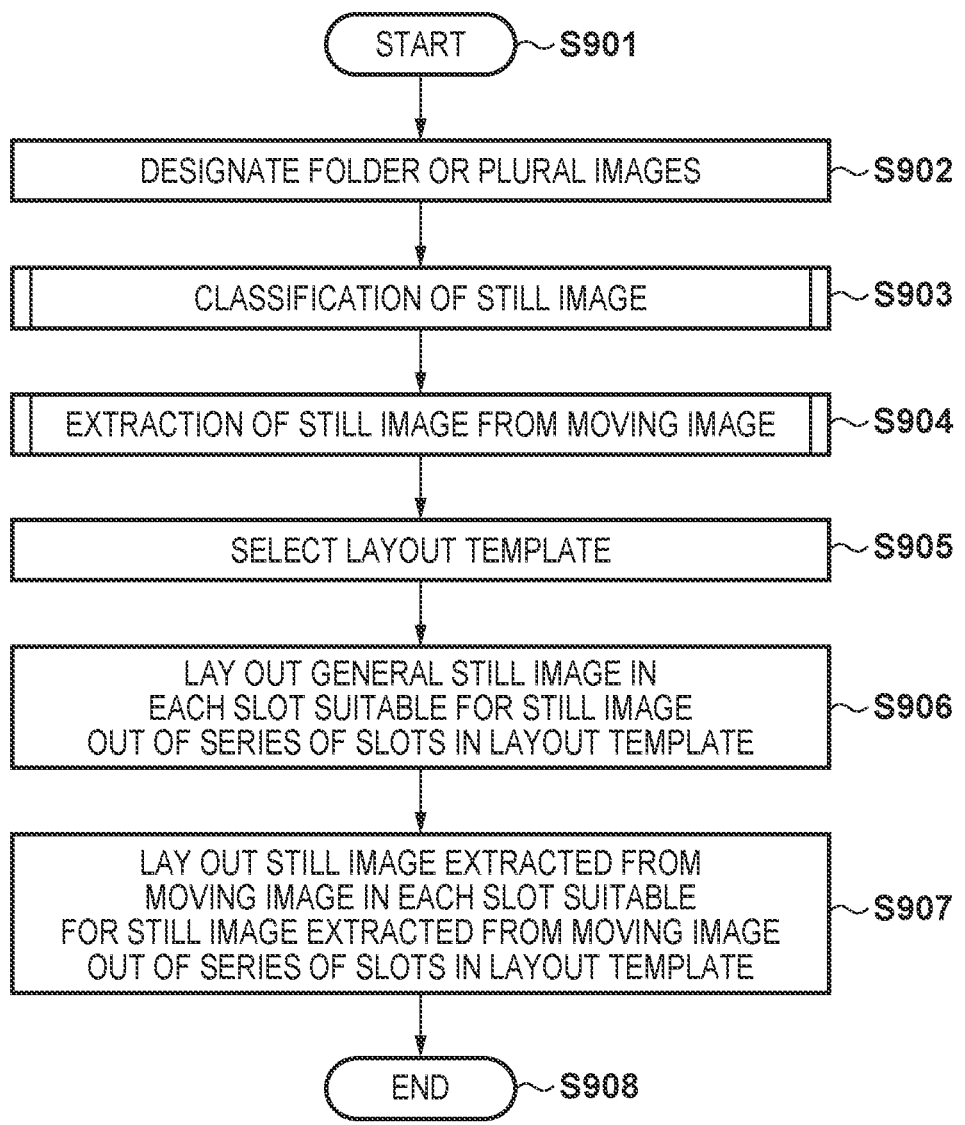
FIG. 9 is a flowchart showing automatic photo album creation processing.

FIG. 9 is a flowchart showing processing of automatically creating a photo album. A program according to the flowchart of FIG. 9 is stored in, for example, an HDD 202, read out to a RAM 201, and executed by a CPU 204. The user selects one of a time selection button 408, a scene selection button 409, and a theme selection button 410 shown in FIG. 4A, and presses a photo album creation button 412. In response to the pressing, an application 80 executes the processing from step S901 in accordance with the flowchart shown in FIG. 9.

In step S902, the application 80 selects a folder (not shown) in a PC 1, which stores still images or moving images, or still images or moving images in the PC 1, and designates the folder or files as the storage destination of an image group or an image group necessary when creating a photo album. Note that in step S902, the user may be caused to select a folder in the PC 1, which stores still images or moving images, or still images or moving images in the PC 1.

In step S903, the application 80 executes still image classification processing shown in FIG. 7 as described in the second embodiment. Here, static11.jpg and static12.jpg are photos (still images) shot by a digital camera and saved. Classification information associated with static11.jpg is coincident with classification information associated with static12.jpg.

In step S904, according to a classification method (time base, scene base, or theme base) in the still image classification processing of step S903, the application 80 executes processing shown in FIG. 8A, 8B, or 8C corresponding to the method. Each of the processes shown in FIGS. 8A, 8B, and 8C is processing of extracting a still image from a moving image. Note that as for the classification method, this embodiment includes not only a case in which one of the time base, the scene base, and the theme base is applied but also a case in which some of the methods are applied in combination. Here, dynamic22.jpg, dynamic43.jpg, dynamic50.jpg, dynamic78.jpg, and dynamic85.jpg are still images extracted from one moving image. All pieces of classification information associated with these still images are coincident with each other, and are also coincident with the classification information associated with static11.jpg and the classification information associated with static12.jpg.

In step S905, based on the classification method applied in step S903, the application 80 selects a layout template associated with the classification method. Assume that the application 80 selects the scene base classification method in step S903. In step S905, the application 80 selects a layout template associated with the scene base classification method.

Assume that the application 80 selects a layout template including a layout template 1200 shown in FIG. 12A. In step S906, the application 80 lays out general still images associated with each other in slots each suitable for a general still image such as a photo shot by a digital still camera or the like and saved within a series of regions associated in the layout template. Here, general still images static11.jpg and static12.jpg associated with each other are laid out in slots 1203 and 1204. At this time, if the number of classified still images is larger than a predetermined number of slots in the series of regions, scoring as described in the first embodiment may be performed, and the still images may be assigned to the predetermined number of slots in descending order of score.

In step S907, the application 80 lays out the still images associated with each other and extracted from the moving image, in the slots suitable for still images extracted from a moving image in the series of regions associated in the layout template. Here, dynamic22.jpg, dynamic43.jpg, dynamic50.jpg, dynamic78.jpg, and dynamic85.jpg associated with each other and extracted from the moving image are laid out in slots 1205 to 1209.

In step S908, the application 80 ends the processing of automatically creating a photo album shown in FIG. 9 and displays a preview/editing screen 415 shown in FIG. 4B.

As described above, the still images each having a high resolution are laid out in the slots 1203 and 1204, each of which is somewhat large and suitable for a general still image such as a photo shot by a digital still camera or the like and saved, within the series of regions associated in the layout template. In addition, the still images extracted from one moving image are laid out in the series of continuous slots 1205 to 1209, each of which is suitable for a still image extracted from a moving image, within the series of regions. As a result, it is possible to provide a photo album creation application that automatically lays out images with realism by making use of the quality of still images and the motion of moving images without a cumbersome operation of the user.

Other Embodiments

The present invention can be implemented even when a program that implements at least one function of the above-described embodiments is supplied to a system or an apparatus via a network or a storage medium, and at least one processor in the computer of the system or apparatus reads out the program and executes processing. The present invention can also be implemented by a circuit (for example, ASIC) that implements at least one function.

In the above-described embodiments, the photo album creation application 80 as shown in FIGS. 4A and 4B has been described as an example of the application. However, the application is not limited to this example, and an arbitrary application having the same image extraction function can also be implemented.

In the above-described embodiments, a personal computer is assumed as the information processing apparatus. However, an arbitrary information processing apparatus (terminal) which enables the same use method, such as a portable telephone, a portable information terminal, a digital still camera, a digital video camera, a portable music player, a game machine, a set-top box, or an Internet appliance, may be used.

In the above-described embodiments, for example, an OS equivalent to Windows® 8 is used as the OS. However, the OS is not limited to this, and an arbitrary OS can be used. In the above-described embodiments, Ethernet® is used as a configuration example of the network 4. However, the network configuration is not limited to this, and an arbitrary network, for example, wireless LAN, IEEE 1394, or Bluetooth® may be used.

As described above, according to the first embodiment, it is possible to provide a photo album creation application that handles both a still image and a moving image together and automatically extracts and lays out a more appropriate image without a cumbersome operation of the user.

According to the second embodiment, based on a classified still image, a still image associated with the still image is automatically extracted from a moving image, and the still images are laid out in a series of regions. As a result, it is possible to provide a photo album creation application that automatically extracts appropriate associated images and lays out them without a cumbersome operation of the user. It is also possible to provide a photo album creation application that extracts a plurality of still images of different scenes from one moving image and lays out them in a series of regions, thereby automatically extracting a variety of images and laying out them without a cumbersome operation of the user.

According to the third embodiment, appropriate still images are laid out, in a layout template, in slots each suitable for a general still image such as a photo shot by a digital still camera or the like and saved and in slots each suitable for a still image extracted from a moving image. As a result, it is possible to provide a photo album creation application that automatically lays out images with realism by making use of the quality of still images and the motion of moving images without a cumbersome operation of the user.

As the processing method of classifying a still image and the processing method of extracting a still image from a moving image, examples using a shooting date/time, a color and histogram, and an object have been described. However, the methods are not limited to these examples. The present invention can be implemented using an arbitrary processing method capable of achieving the same object. A shooting date/time, a color and histogram, an object, another processing method, and the like may be combined to classify a still image or extract a still image from a moving image. When the plurality of processing methods are combined, the level of completion of a photo album can be improved.

As the image analysis methods, examples using the elements Color, Contrast, Brightness, Focus, and Composition have been described. However, the methods are not limited to these examples. The present invention can be implemented using an arbitrary analysis method capable of achieving the same object.

While the present invention has been described in detail with reference to embodiments, the invention is not limited to the specific embodiments, and various changes and modifications can be made within the spirit and scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-045090, filed Mar. 6, 2015, which is hereby incorporated by reference herein in its entirety.

What is claimed is:

1. A method comprising:
evaluating a first still image included in a still image file and a second still image extracted from a moving image included in a moving image file as layout targets on a template;
specifying a still image of the layout target on the template out of the first still image and the second still image in accordance with the evaluation; and
laying out the specified still image of the layout target on the template,
wherein in the evaluating, evaluation values are calculated using a common evaluation criterion for the first still image and the second still image, and at least one of the evaluation value calculated for the first still image and the evaluation value calculated for the second still image is modified such that a possibility that the second still image is specified as the layout target on the template becomes high.

2. The method according to claim 1, wherein in the specifying, still images of the layout targets as many as the number of still images that can be laid out in the template are specified in descending order of modified evaluation value.

3. The method according to claim 1, further comprising:
classifying the first still image; and
extracting the second still image from the moving image file based on a criterion of the classification.

4. The method according to claim 3, wherein the criterion of the classification includes at least one of color information, object information, and time information.

5. The method according to claim 3, further comprising:
determining, in a case where the second still image extracted based on the criterion of the classification comprises a plurality of second still images, whether the plurality of second still images correspond to the same scene;
extracting, upon determining that the plurality of second still images correspond to the same scene, a fourth still image corresponding to a scene different from the scene from the moving image file in the extracting; and
replacing the second still image with the extracted fourth still image in the laying out.

6. The method according to claim 1, further comprising:
acquiring, in a case where the second still image is specified, a third still image, from the moving image file, whose evaluation value is larger than the evaluation value of the specified second still image; and
replacing the second still image with the acquired third still image in the laying out.

7. The method according to claim 1, wherein the template includes a slot capable of laying out a still image, and
wherein, in the laying out, the specified still image of the layout target is laid out on the template in accordance with an attribute of the slot.

8. The method according to claim 7, wherein the attribute of the slot is a type of the still image.

9. The method according to claim 1, wherein in the evaluating, the evaluation is done based on at least one of a color, contrast, brightness, focus, and composition in an image.

10. A method comprising:
evaluating a first still image included in a still image file and a second still image extracted from a moving image included in a moving image file as layout targets on a template;
specifying a still image of the layout target on the template out of the first still image and the second still image in accordance with the evaluation; and
laying out the specified still image of the layout target on the template,
wherein, in a case where the second still image is specified, a third still image whose evaluation value is larger than the evaluation value of the specified second still image is acquired from the moving image file, and
wherein the second still image is replaced with the acquired third still image in the laying out.

11. The method according to claim 10, wherein in the acquiring, the third still image is acquired from frames in a predetermined range before and after a frame corresponding to the specified second still image.

12. The method according to claim 10, wherein the first still image and the second still image are evaluated such that a possibility that the second still image is specified as the layout target on the template becomes higher than that for the first still image.

13. The method according to claim 10, wherein in the evaluating, the evaluation is done based on at least one of a color, contrast, brightness, focus, and composition in an image.

14. A method comprising:
evaluating a first still image included in a still image file and a second still extracted from a moving image included in a moving image file as layout targets on a template;
specifying a still image of the layout target on the template out of the first still image and the second still image in accordance with the evaluation; and
laying out the specified still image of the layout target on the template, wherein, in a case where a plurality of second still images are extracted in the extracting, it is determined whether the plurality of second still images correspond to the same scene, wherein, upon determining that the plurality of second still images correspond to the same scene, a third still image corresponding to a scene different from the scene is extracted from the moving image file in the extracting, and wherein the second still image is replaced with the extracted third still image in the laying out.

15. The method according to claim 14, wherein the scene is determined by an object included in the second still image.

16. The method according to claim 14, wherein the first still image and the second still image are evaluated such that a possibility that the second still image is specified as the layout target on the template becomes higher than that for the first still image.

17. The method according to claim 16, wherein in the evaluating, evaluation values are calculated using a common evaluation criterion for the first still image and the second still image, and at least one of the evaluation value calculated for the first still image and the evaluation value calculated for the second still image is modified such that the possibility that the second still image is specified as the layout target on the template becomes high.

18. The method according to claim 14, further comprising:
classifying the first still image,
wherein, in the extracting, the second still image is extracted from the moving image file based on a criterion of the classification.

19. The method according to claim 18, wherein the criterion of the classification includes at least one of color information, object information, and time information.

20. The method according to claim 14, wherein in the evaluating, the evaluation is done based on at least one of a color, contrast, brightness, focus, and composition in an image.

21. An information processing apparatus comprising:
a processor; and
a memory configured to store a program,
wherein the processor functions, by executing the program stored in the memory, as:
an evaluation unit configured to evaluate a first still image included in a still image file and a second still image extracted from a moving image included in a moving image file as layout targets on a template;
a specifying unit configured to specify a still image of the layout target on the template out of the first still image and the second still image in accordance with the evaluation by the evaluation unit; and
a layout unit configured to lay out the still image of the layout target specified by the specifying unit on the template,
wherein the evaluation unit calculates evaluation values using a common evaluation criterion for the first still image and the second still image, and modifies at least one of the evaluation value calculated for the first still image and the evaluation value calculated for the second still image such that a possibility that the second still image is specified as the layout target on the template becomes high.

22. A non-transitory computer-readable storage medium storing a program that causes a computer to function so as to:
evaluate a first still image included in a still image file and a second still image extracted from a moving image included in a moving image file as layout targets on a template;
specify a still image of the layout target on the template out of the first still image and the second still image in accordance with the evaluation; and
lay out the specified still image of the layout target on the template,
wherein, when performing the evaluation, evaluation values are calculated using a common evaluation criterion for the first still image and the second still image, and at least one of the evaluation value calculated for the first still image and the evaluation value calculated for the second still image is modified such that a possibility that the second still image is specified as the layout target on the template becomes high.

* * * * *